United States Patent
Beech

(10) Patent No.: US 9,004,519 B1
(45) Date of Patent: Apr. 14, 2015

(54) TOW BAR CONTROLLED TRAILER AND METHOD

(71) Applicant: Geoffrey S. Beech, Madison, AL (US)

(72) Inventor: Geoffrey S. Beech, Madison, AL (US)

( * ) Notice: Subject to any disclaimer, the term of this patent is extended or adjusted under 35 U.S.C. 154(b) by 59 days.

(21) Appl. No.: 13/628,261

(22) Filed: Sep. 27, 2012

Related U.S. Application Data

(60) Provisional application No. 61/626,961, filed on Sep. 28, 2011.

(51) Int. Cl.
*B62D 13/00* (2006.01)

(52) U.S. Cl.
CPC ...................... *B62D 13/00* (2013.01)

(58) Field of Classification Search
USPC .......................... 280/442, 444, 482
See application file for complete search history.

(56) References Cited

U.S. PATENT DOCUMENTS

| | | | | |
|---|---|---|---|---|
| 1,756,239 | A * | 4/1930 | Chojnacki et al. | 280/103 |
| 1,824,554 | A * | 9/1931 | Lathers | 188/112 R |
| 2,559,487 | A * | 7/1951 | Whitlow | 280/444 |
| 2,608,417 | A * | 8/1952 | Kelsey | 280/103 |
| 3,012,638 | A * | 12/1961 | Morlik | 188/192 |
| 3,695,628 | A * | 10/1972 | Fisher | 280/103 |
| 4,208,063 | A | 6/1980 | Baker et al. | |
| 4,579,362 | A * | 4/1986 | Kirkpatrick | 280/444 |
| 4,720,119 | A * | 1/1988 | Ritter | 280/443 |
| 4,824,135 | A | 4/1989 | McGregor | |
| 5,244,226 | A | 9/1993 | Bergh | |
| 5,329,451 | A | 7/1994 | Notsu | |
| 5,340,142 | A * | 8/1994 | Kuhns | 280/444 |
| 5,579,228 | A | 11/1996 | Kimbrough et al. | |
| 6,158,759 | A | 12/2000 | Perry | |
| 6,176,504 | B1 * | 1/2001 | Van Mill et al. | 280/444 |
| 7,225,891 | B2 | 6/2007 | Gehring et al. | |
| 7,694,993 | B2 | 4/2010 | Timmons, Jr. | |
| 7,905,507 | B2 | 3/2011 | Perri | |
| 8,061,489 | B1 | 11/2011 | Laverns | |
| 2002/0180178 | A1 | 12/2002 | Masters et al. | |
| 2004/0104555 | A1 | 6/2004 | Atley | |
| 2008/0224444 | A1 | 9/2008 | Atley | |
| 2008/0258432 | A1 | 10/2008 | Haslam | |
| 2010/0052289 | A1 | 3/2010 | Frey et al. | |
| 2011/0042154 | A1 | 2/2011 | Bartel | |

* cited by examiner

*Primary Examiner* — Kevin Hurley
*Assistant Examiner* — Michael Stabley
(74) *Attorney, Agent, or Firm* — Mark Clodfelter

(57) ABSTRACT

A switchable mechanism for steering a trailer when towing and backing is disclosed. A turntable having a rotatable upper portion is attached to a front of a trailer, with a slide mounted to the turntable with a center of the slide mounted generally over an axis of rotation of the turntable. A carriage is mounted to the slide, the carriage being movable between a first position and a second position. At least one steering controller is coupled between the carriage and steerable wheels of the trailer. A towbar is coupled to the turntable, with sideways displacement of the towbar steering the steerable wheels in both forward and backward directions. The towbar is connectable to any conventional hitch, meaning that no modifications are needed to the tow vehicle, and any tow vehicle with a conventional hitch can tow a trailer of the instant invention.

23 Claims, 26 Drawing Sheets

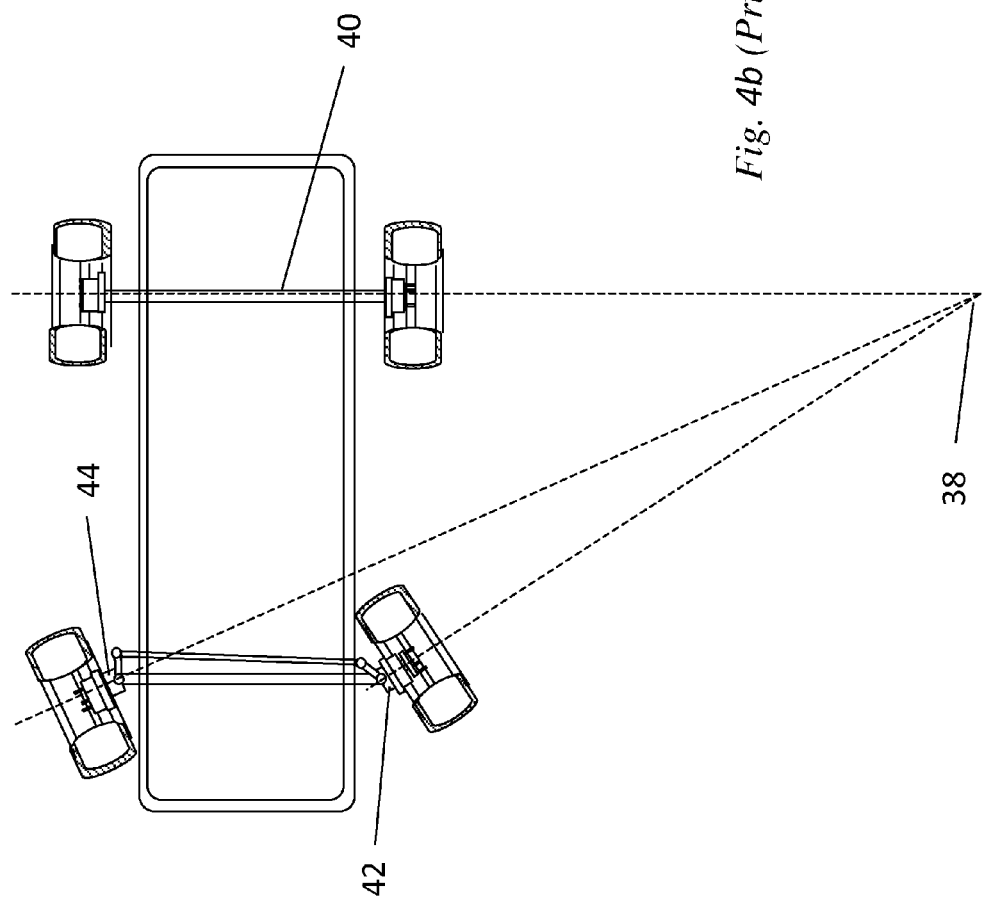

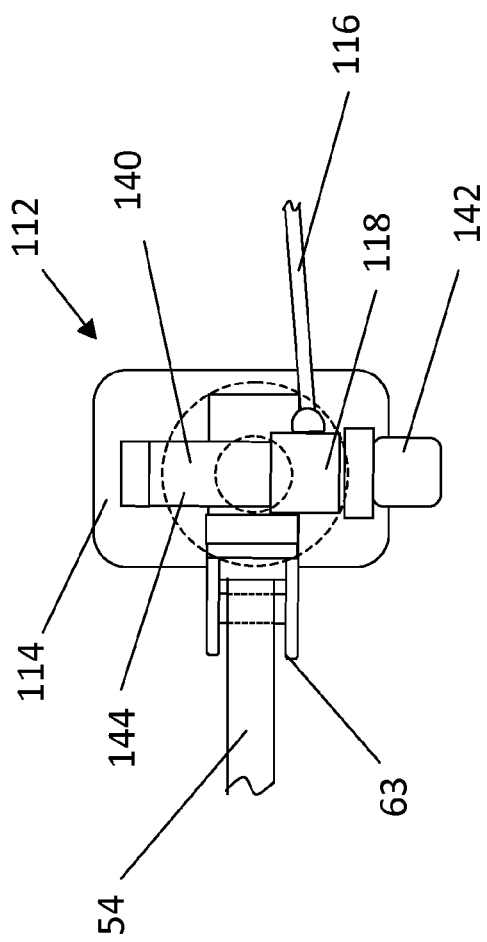
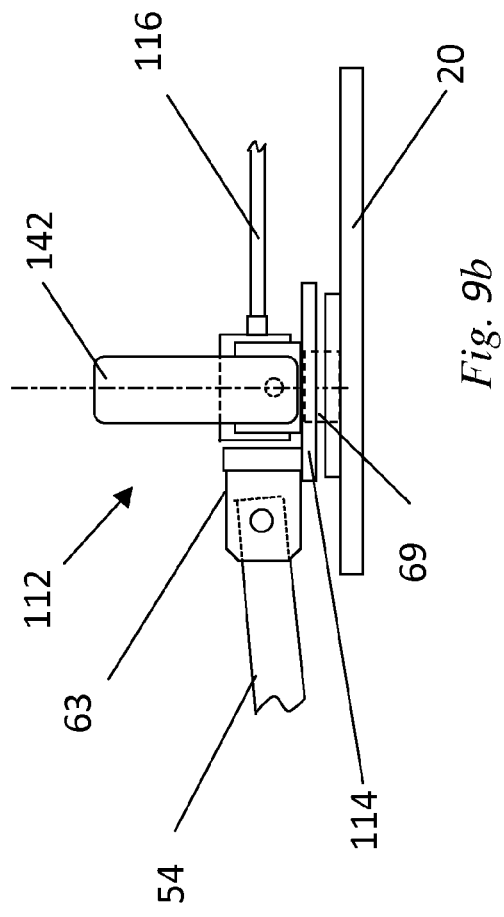
Fig. 9a
Fig. 9b

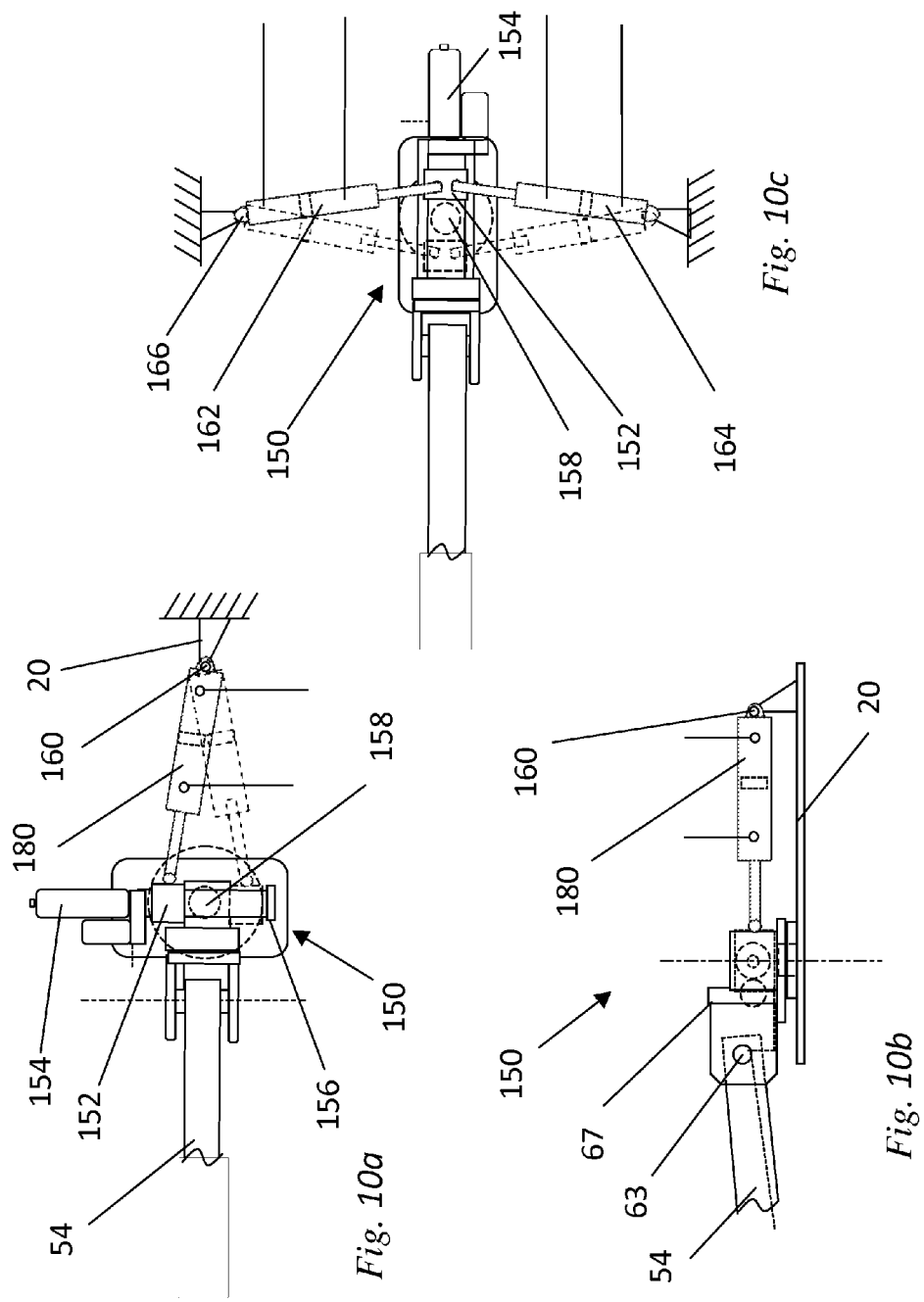

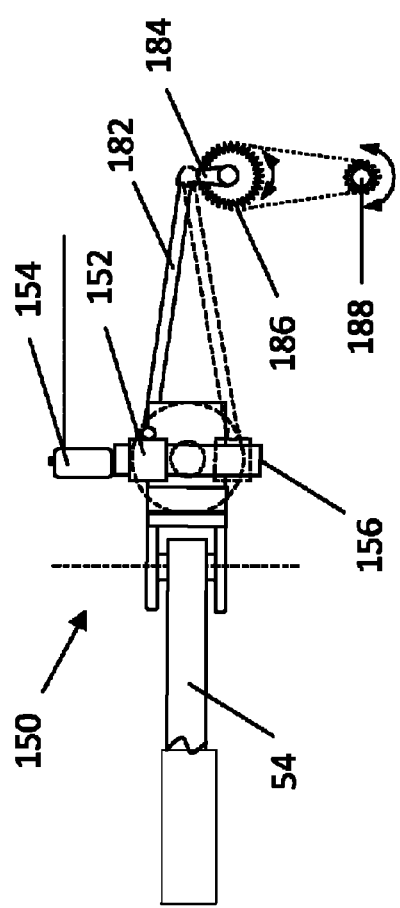
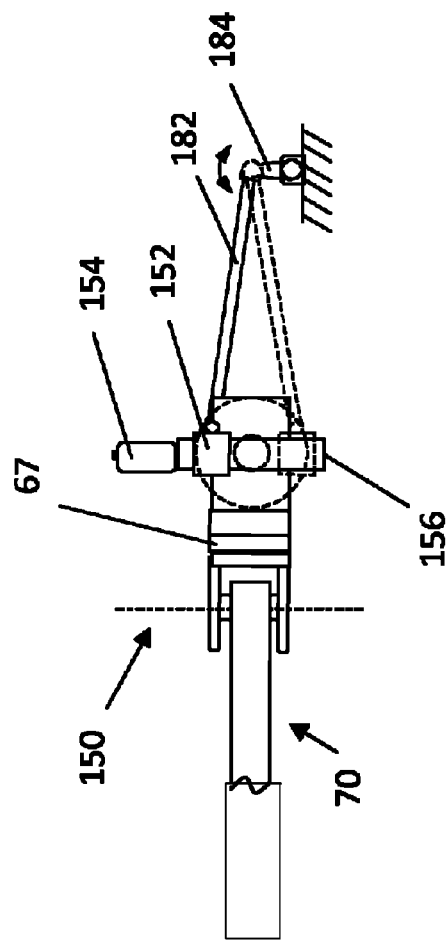
Fig. 11a
Fig. 12a

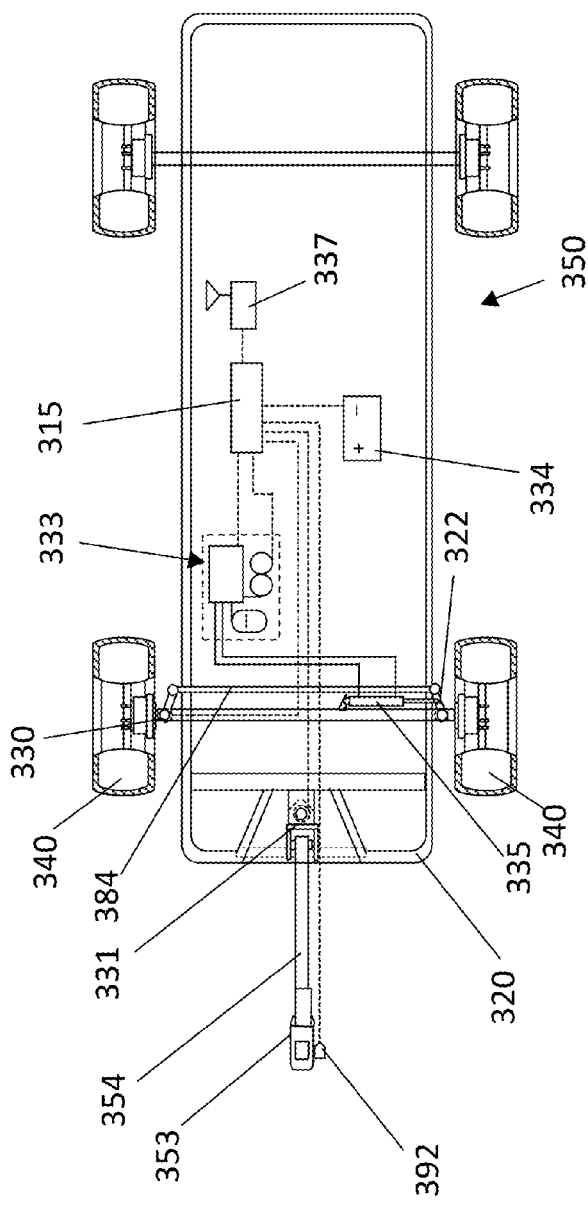
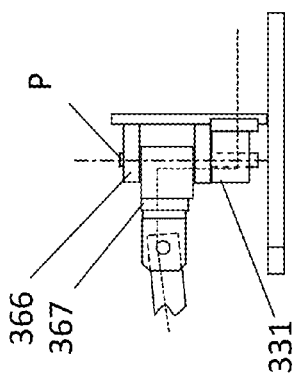
Fig. 14
Fig. 14a

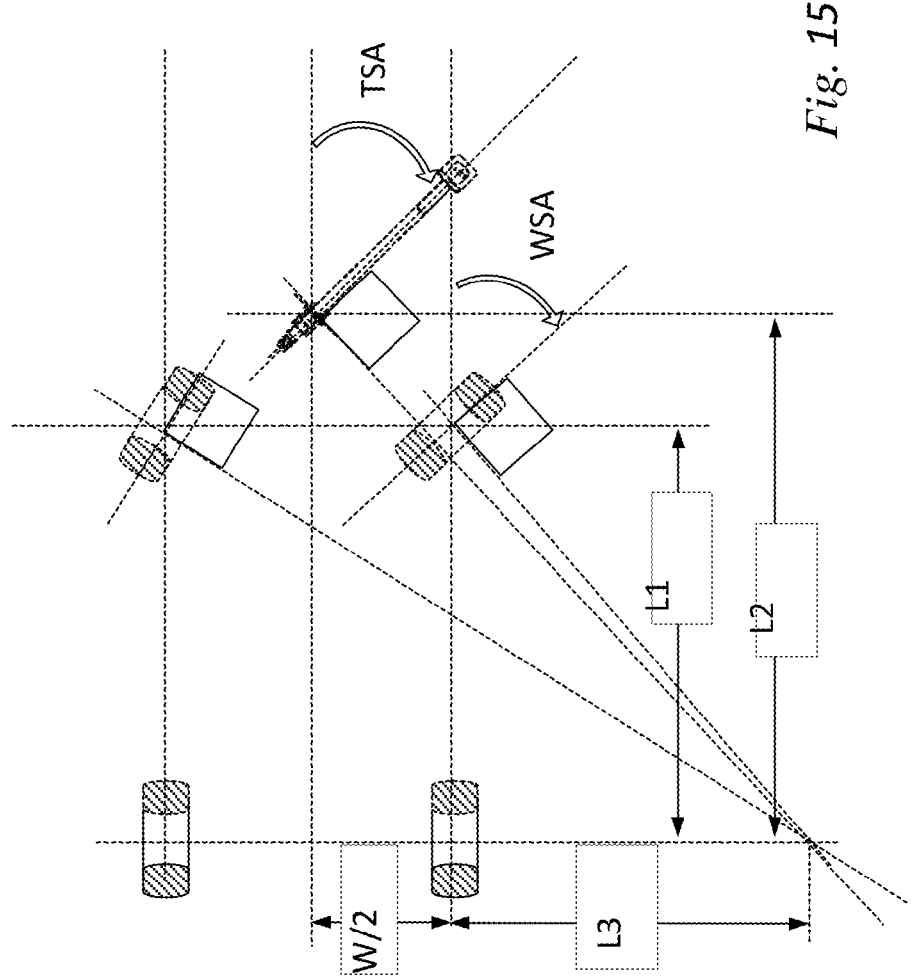

TOW BAR CONTROLLED TRAILER AND METHOD

CROSS REFERENCE TO RELATED APPLICATIONS

This application claims the benefit of provisional application No. 61/626,961, filed Sep. 28, 2011, and which is incorporated by reference herein in its entirety.

FIELD OF THE INVENTION

This invention generally relates to towed trailers and the like, and more particularly to a trailer that is actively steered according to towbar articulation angle when towed in a forward direction, and is also actively steered according to towbar articulation angle in a reverse direction. Switching between the forward direction and reverse direction can be automatic. In addition, undesirable loads transmitted by the trailer to the tow vehicle are reduced or eliminated.

BACKGROUND OF THE INVENTION

Referring to FIGS. 1 and 1a, a center of turning 10 of a trailer 12 is the point about which a trailer will readily turn when pushed or pulled under nominal operations. For most traditional single-axle automotive trailers with a tow bar rigidly attached to the trailer and pivot attachment about the tow vehicle hitch 14, the center of turning 10 is at the midpoint between the trailer's wheels. For a dual axle trailer as shown in FIGS. 1 and 1a, the center of turning 10 is between the wheels in both lateral and longitudinal directions. During nominal operation, the pitch and yaw inertia of this type trailer are accelerated about the center of turning of the trailer. Such acceleration of these pitch and yaw inertias develops reaction loads on the tow vehicle hitch that are transmitted to the tow vehicle, causing it to feel unsteady at times, and may be potentially dangerous. Further, such yaw inertias and reaction loads subject suspension components, steering components and tires of the tow vehicle to additional or undue wear. These accelerated pitch and yaw forces are proportional to the distance between the center of turning of the trailer and the tow vehicle hitch and the magnitude of the inertias. When the center of mass 16 of trailer 12 and its cargo is displaced off the center of turning 10, as may be common in many operations, and when trailer 12 is subjected to the road imperfections, wind and weather conditions, the single pivot trailer imparts additional lateral, or side loads, at the hitch and receiver connection, exacerbating wear and safety considerations.

Two-axle, tow bar-steered agricultural wagons as shown in FIGS. 2 and 3 have been a fixture on the rural American landscape for generations. These trailers can be functionally classified into two groups. As shown in FIG. 2, steered-axle trailers have a pivot 18 between the front wheels, the pivot connected to towbar 20 such that when the towbar is moved to one side or the other, the wheels and axle are turned about the pivot along with the towbar. As shown in FIG. 3, the other type farm trailer is provided with a pivot 22 on or near the front axle 24 between the front wheels, with a towbar 26 connected between pivot 22 and hitch 28 on the towing vehicle. Pivoting connecting rods 30 are connected on towbar 26 just forward of pivot 22, and extend and pivotally connect to a respective steering arm 32 attached to a respective wheel, the wheels conventionally supported for horizontal rotation about a generally vertical kingpin, ball joints or the like (not shown). As such, when towbar 26 is moved to one side or the other, connecting rods 30 pull or push the wheels to rotate about the kingpin, turning the front wheels to steer the wagon according to sideways movement or displacement of the towbar. It is noted that this type steering is called parallel steering, because the steering arms 32 are angled to maintain the wheels in parallel relation at al times. Children's toy wagons and gardening wagons may employ similar construction. Because these trailers cannot be backed up due to a steering instability, they are not generally considered road worthy.

Most modern vehicles and trailers that actively steer their wheels, as seen in FIGS. 4 and 4a, employ steering geometry generally known as Ackerman steering. This type of steering accommodates the facts that, during a turn, the outer wheel travels a further distance than the inside wheel. The implication of this is that, in order for both the inside wheel and outside wheel to track properly, they must be turned to different angles. In other words, for any given turn a vehicle takes, the outside wheel will be turned, with respect to a straight ahead steering position, less than the inside wheel. This is shown in FIG. 4, wherein steering arms 34 are angled such that they each point to a common point 36 generally centered on the rear axle, as shown by dashed lines. This geometry ensures that, for any given turn, such as shown in FIG. 4a, there will be a common point 38 at which the rear axle 40 and front axles 42, 44 will be directed, as shown by dashed lines. Since common point 38 is the center about which the vehicle turns, and the wheel axles all point directly at point 38, it is thus ensured that, since the wheels are perpendicular to their respective axles, the wheels accurately track around the turn without scrubbing, which would otherwise cause excessive wear to the tires and vehicle components.

For anyone who owns a recreational boat, vehicle or the like transported by a trailer to where the vehicle or boat is used, the problems of backing a trailer are well known. The single or double axle trailer as shown in FIGS. 1 and 1a becomes a vehicle steered by the rigidly attached towbar, which is attached to the towing vehicle via a hitch that allows the towbar to pivot from side to side, and also accommodates some vertical pivoting. To back a trailer, the driver is required to steer in an opposite direction to what he would normally steer when travelling forward, with the added length of a towbar magnifying any errors he might make. For a simple single or double axle trailer, the rule of thumb is for the driver to steer with his hands on the bottom of the steering wheel, and move the wheel in the direction he wants the rear of the trailer to go. While this can be difficult, it can be mastered with practice. However, for trailers such as a farm trailer as described above where the front wheels are steered by the towbar, backing of such a trailer can be almost impossible.

Attempts have been made to overcome this problem. In U.S. Pat. No. 4,208,063, to Baker, a trailer is disclosed that comprises a sub-frame for each steered axle that rotates based on an articulation angle between trailer hitch and receiver when the trailer is backed. When towed in a forward direction, no attempt to steer the trailer wheels is made. Drawbacks of Baker are that the tow vehicle hitch must be modified, and the trailer cannot be used with an unmodified tow vehicle.

U.S. Pat. No. 4,824,135, to McGregor, discloses a trailer with a steering system coupled to a tow vehicle steering mechanism about a single pivot at the hitch and receiver connection. In one embodiment, the rear axle of a dual axle trailer is connected to the tow vehicle steering mechanism, while the wheels of the steered front axle are connected to each other through a tow rod, but not with active control. McGregor also discloses a vertically pivoting hitch for accommodating pitching motions of the trailer, but the pivot is at the bumper. Here, pitching motions of the trailer impart large forces to the bumper of the tow vehicle. Like Baker, the hitch and tow vehicle must be modified, and the towed trailer cannot be towed by an unmodified tow vehicle.

U.S. Pat. No. 5,244,226, to Bergh, discloses a single steered-axle trailer with a single pivot at the tow vehicle hitch/receiver that steers opposite the articulation angle between tow vehicle and trailer when in reverse mode and steers at the same angle when in forward mode. However, Bergh carries only one pivot, at the hitch/receiver, and one steered axle. While Bergh improves reverse steering performance for a single axle trailer, the addition of a second axle would cause excessive wheel scrubbing during operation. Also, as discussed above, the hitch and tow vehicle of Bergh must be modified, and the trailer thereof cannot be towed by an unmodified hitch on another vehicle.

In each of Baker, McGregor and Bergh, the center of turning of their respective trailers is at the center between the wheels, with pitch and yaw reaction loads proportional to the distance between the center of turning and the tow vehicle hitch, mass and inertia concerns. As the capacity and size of the trailer increases, there is a corresponding requirement for a larger tow vehicle to stabilize the pitch and yaw reaction loads in addition to providing sufficient pulling and braking forces.

Bartel 2011/042154 discloses a system and method for controlling a trailer whereby the trailer uses a load sensor to signal a microprocessor that automatically signals propulsion and braking commands on a trailer. However, without actively controlled steering, uneven application of drive torque at the trailer wheel would induce large lateral reaction forces at the trailer hitch/receiver. With large vertical and lateral side forces intermixed with tension and compression control forces at said load sensor for drive commands, automatic control of drive system and braking based on load sensor input is limited.

In view of the foregoing, it is apparent that a need exists for a trailer steering system that will allow a steered trailer to be easily backed, and which uses a conventional ball hitch or other conventional hitch, and which in some embodiments requires little to no additional modifications to a tow vehicle or to a tow vehicle hitch, and reduces or eliminates side forces imparted on the tow vehicle hitch and provides for improved automatic control of trailer propulsion and braking functions.

BRIEF DESCRIPTION OF DRAWINGS

FIG. 4 is a diagrammatic view illustrating geometry of Ackerman steering.

FIG. 5b is a diagrammatic illustration showing details of construction of the embodiment of FIG. 5a.

FIG. 9a is a top diagrammatic illustration of an electrically operated carriage of the embodiment of FIG. 9.

FIG. 9b is a side diagrammatic illustration of the electrically operated carriage of the embodiment of FIG. 9.

FIG. 10a is a diagrammatic illustration showing details of construction of another embodiment of my invention.

FIG. 10b is a diagrammatic illustration showing details of construction of the embodiment of FIG. 10a.

FIG. 10c is a diagrammatic illustration showing construction details of the embodiment of FIG. 10.

FIG. 11a is a diagrammatic illustration of construction details of the embodiment of FIG. 11.

FIG. 12a is a diagrammatic illustration of construction details of the embodiment of FIG. 12.

FIG. 14 is a diagrammatic illustration of another embodiment of the instant invention.

FIG. 14a is a diagrammatic illustration of details of construction of the embodiment of FIG. 15 is an illustration of wheel steering angle as a function of TSA.

DETAILED DESCRIPTION OF THE INVENTION

Figure 1:
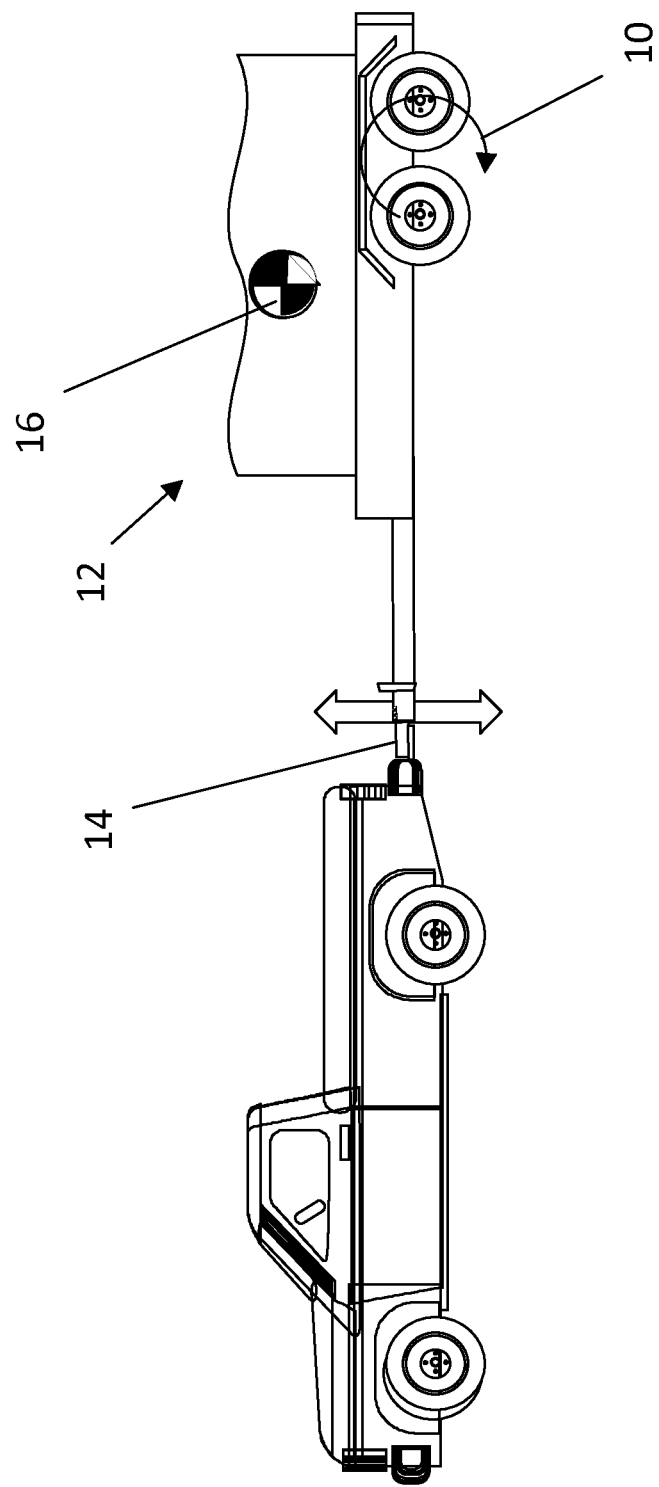
FIG. 1 is a diagrammatic illustration of a prior art trailer and tow vehicle
Figure 1A:
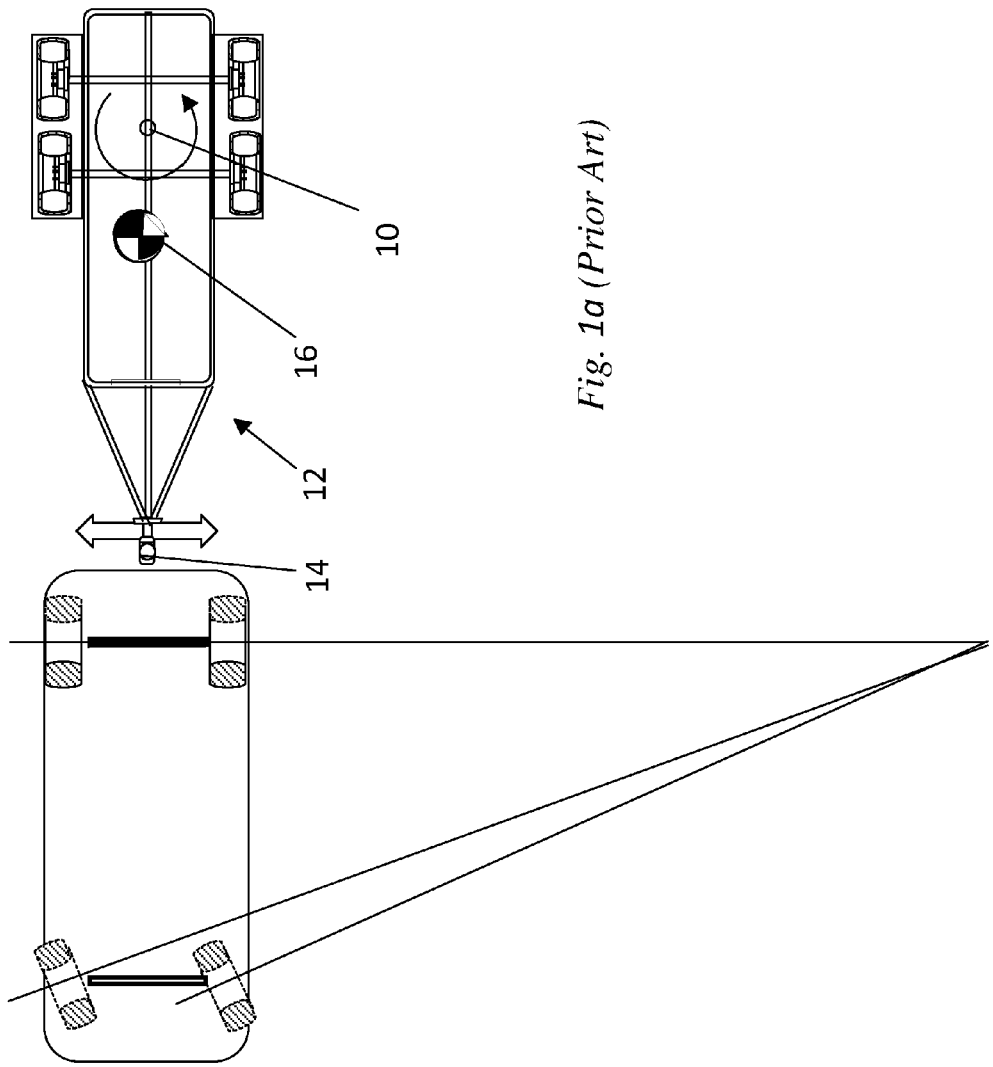
FIG. 1a is a diagrammatic illustration of the prior art trailer and tow vehicle of FIG. 1.
Figure 2:
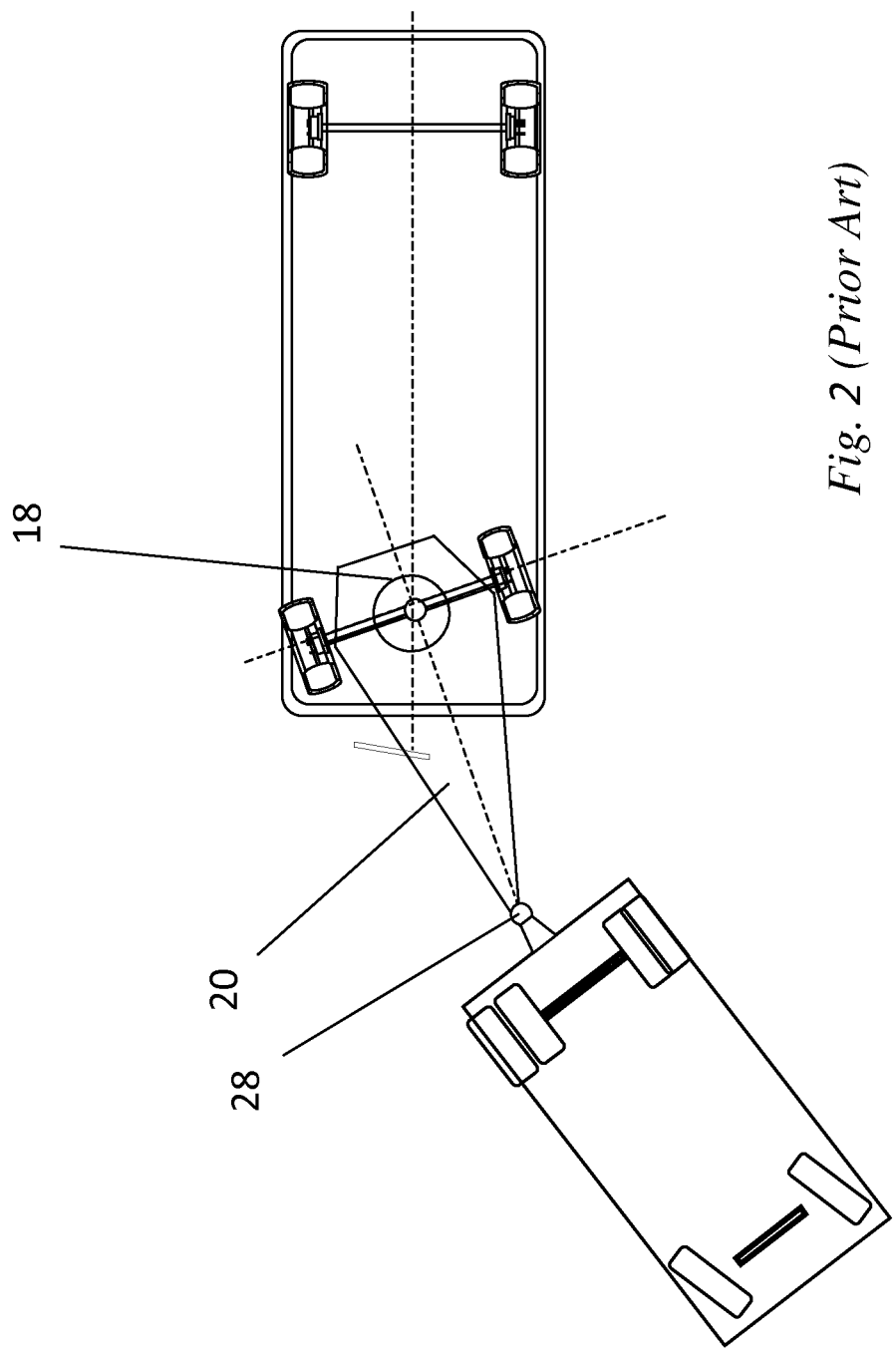
FIG. 2 is a diagrammatic illustration of a prior art trailer wherein front wheels thereof are steered about a common pivot point.
Figure 3:
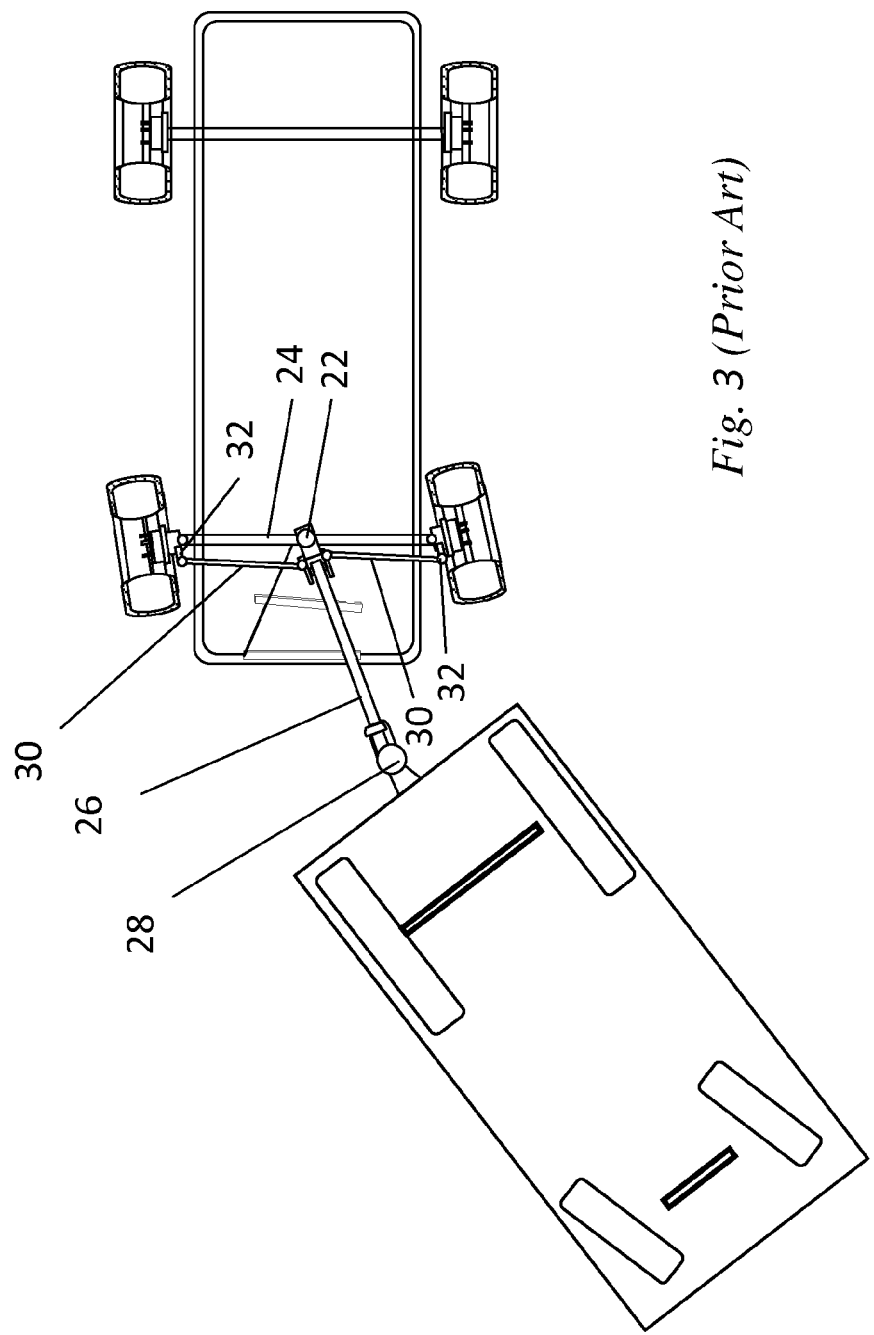
FIG. 3 is a diagrammatic illustration of a prior art trailer wherein front wheels thereof are steered by sideways towbar movement.
Figure 4A:
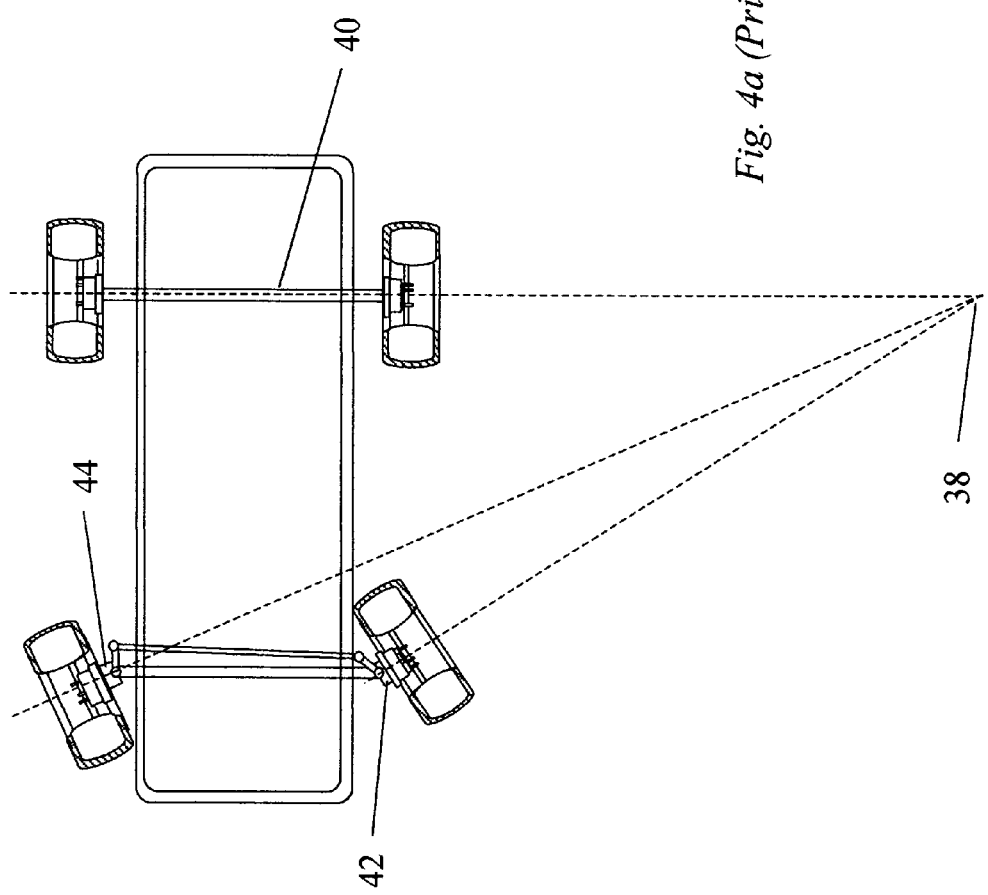
FIG. 4a is a diagrammatic view illustrating the working principle of Ackerman steering
Figure 5:
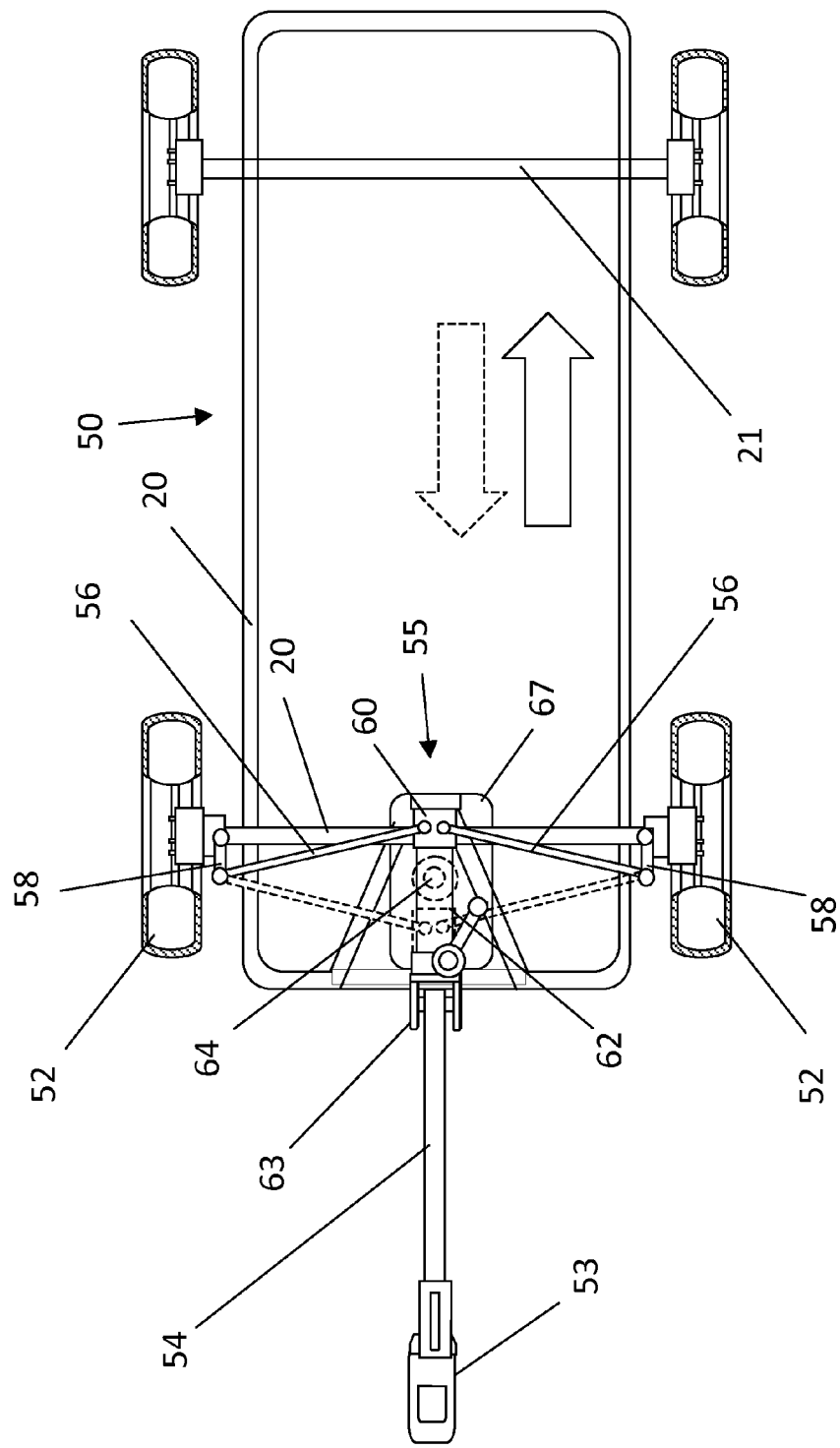
FIG. 5 is a diagrammatic illustration of a basic steered trailer of the instant invention.
Figure 5A:
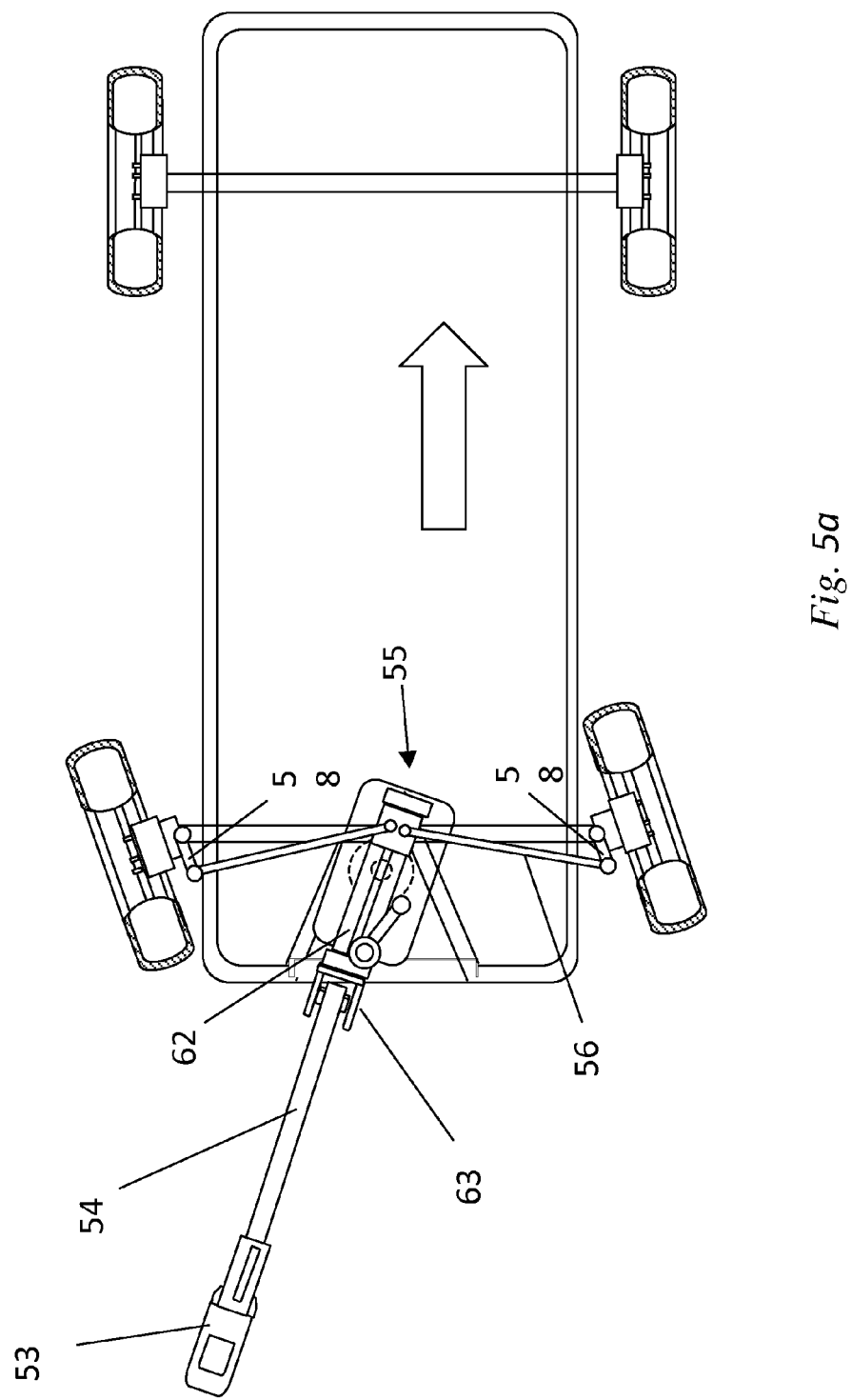
FIG. 5a is a diagrammatic illustration of the embodiment of FIG. 5 in a backing mode of operation.

Referring initially to FIG. 5, a trailer 50 is shown. Trailer 50 is a dual axle trailer having wheels at the front and rear of the trailer, with front wheels 52 in a parallel steering arrangement and being turned or steered in response to sideways movement in either direction by a towbar 54. Tow bar 54 is attached to a switchable coupling assembly 55 that changes the steering direction depending on the forward or reverse mode of operation. Here, a steering controller is coupled between at least one steerable axle and switchable coupling 55, and which may be connecting rods 56, one for each of the front wheels, and are pivotally attached at one end to a steering arm 58 that is in turn attached to a respective wheel 52. The other end of each of connecting rods 56 is attached to a carriage 60 that is slidably mounted to a slide or track 62, with a midpoint of slide or track 62 generally corresponding to a pivot point 64 about which towbar 54 and slide or track 62 pivots. With this construction, and with carriage 60 positioned behind pivot point 64 as shown, when towbar 54 is moved sideways in either direction, the rear of track or slide 62 pivots in the opposite direction, steering wheels 52 in a direction opposite to the sideways direction the towbar is moved, as shown in FIG. 5*a*. In this configuration, trailer 50 can easily be steered when backing, with the degree of turning of the wheels being proportional, or otherwise corresponding to degree of sideways displacement of the towbar, but in an opposite direction to the sideways direction of movement of the towbar. When trailer 50 is to be towed in a forward direction, carriage 60, with the pivot points for connecting rods 56, is moved to a position in front of pivot 64 as shown by dashed lines in FIG. 5, thus creating a conventional configuration as shown in FIG. 3, where degree of turning of the wheels 52 is likewise proportional or otherwise corresponding to degree of sideways displacement of the towbar, and in the same sideways direction as towbar movement.

Figure 5B:
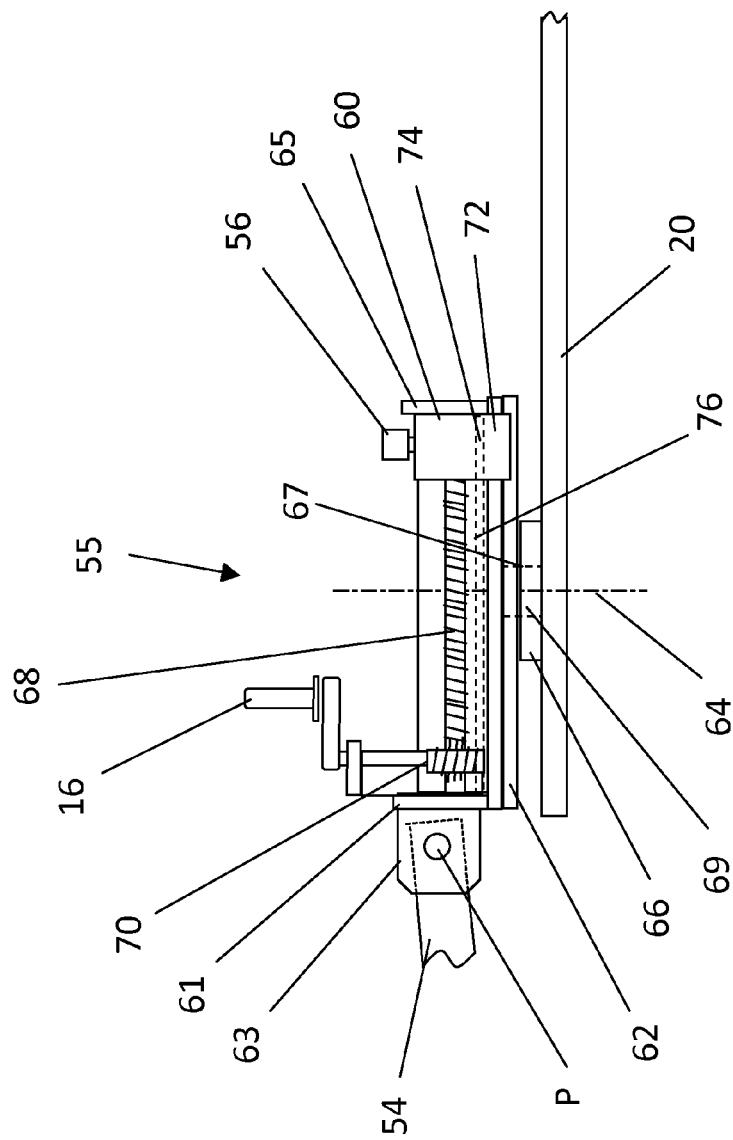

FIG. 5*b* further illustrates, by way of example only, one possible construction of a simple, manually operated switchable coupling 55. Here, a rotatable turntable 66 of durable metal is provided, and having a short, central axle or shaft 69 (dashed lines fixed to one side of the turntable and extending through the other side in order to facilitate rotation of the top or upper portion side 67 of the turntable. Central axle 69 defines an axis 64 about which upper portion 67 rotates. Bearings or a bushing surface are provided between the shaft and rotating side. Since turntable 66 reacts both steering and towing loads, it will be of heavy construction, with appropriate structural support and grease fittings for applying lubrication between load bearing surfaces and bearings. Also, since it is part of the steering system, tolerances between moving parts will be held as tight as possible in order to reduce or eliminate play in the steering system. The lower side of turntable 66 is attached to structural or frame members 20 of the trailer, as by welding or fasteners, so that upper side 67 can freely rotate.

Slide or track 62 is fixedly mounted to the rotating top side 67 of the turntable, as by welding or fasteners. A clevis 63 is mounted at one end of track 62, and which receives one end of towbar 54, as by a pin P extending through the clevis and towbar. At the other end of track 62 is provided a stop 65, which also rotatably supports one end of a leadscrew 68, as by antifriction bearings or bushings. The other end of leadscrew 68 is supported as shown by antifriction bearings or a bushing in a crossmember 61 between the ends of clevis 63. Carriage 60 threadably engages leadscrew 68, which is rotated, for example by a worm gear 70 and appropriate gear on leadscrew 68. For rotating the leadscrew, a crank handle 16 may be used to rotate worm gear 70, which in turn rotates lead screw 68 to move carriage 60 from a rearward position (shown) to a forward position as shown in dashed lines in FIG. 5. Sides 72 of carriage 60 may extend downward as shown over opposed sides of track 62 for strength and to distribute steering loads between carriage 60 and track 62, and in some embodiments, may be fitted with a dovetail or similar slide 74 (dashed lines) that engages a mating dovetail or T-shaped track cut along dashed line 76 of slide 62. Threaded stub shafts (not shown) may be welded or otherwise fixed to a top of carriage 60 (shown) or to opposed sides of carriage 62, in order to connect knuckle joints or the like to respective ends of connecting rods 56.

In some embodiments, switchable coupling 55 may be enclosed by a housing (not shown) to prevent dust and dirt from contaminating lubricated portions of the slide, carriage, gears and any other lubricated components. Of course, an operating handle or lever for manually operating the slide would extend to an exterior of any such housing.

Figure 5C:
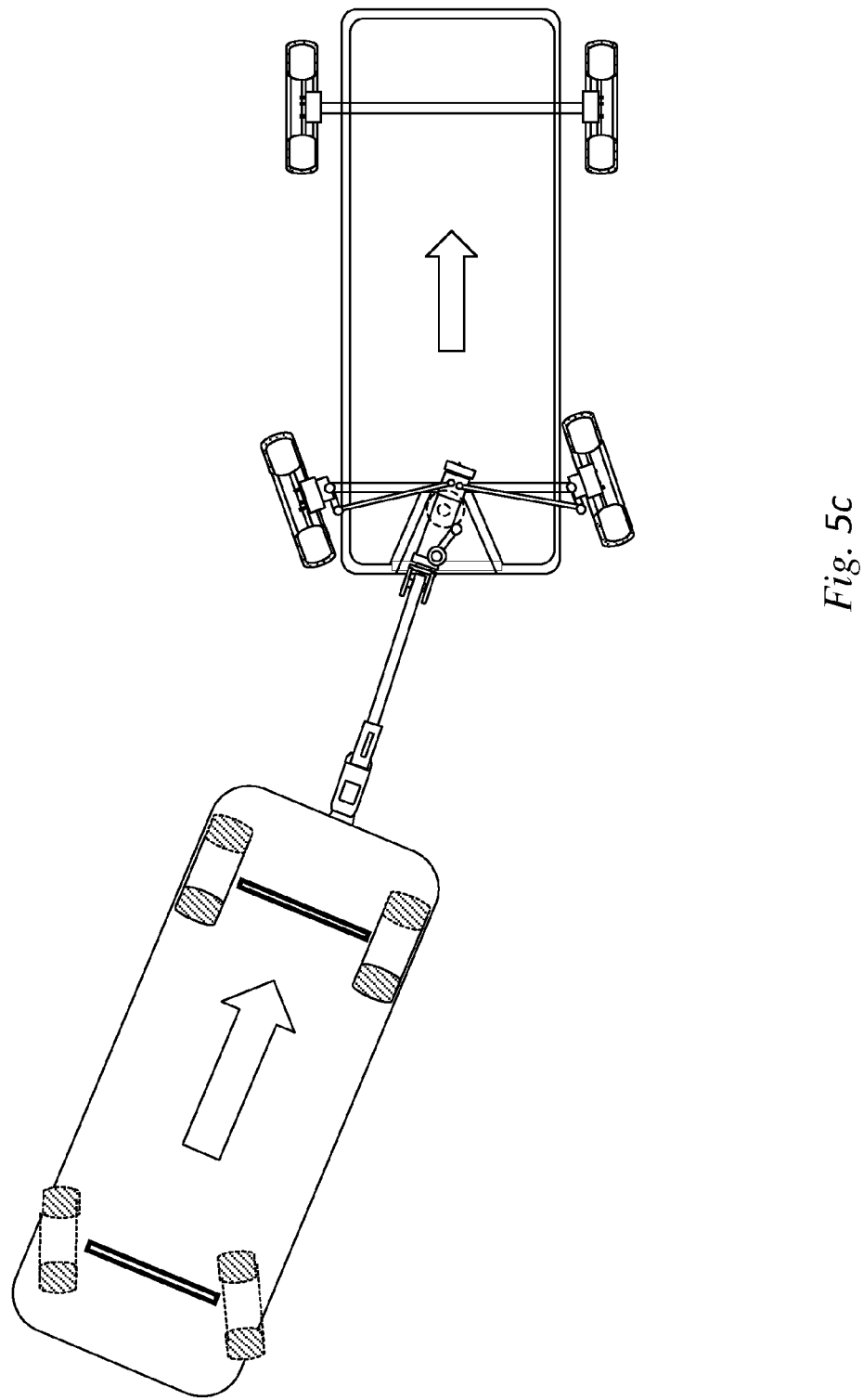
FIG. 5c is a diagrammatic illustration of a backing mode of the instant invention.
Figure 6:
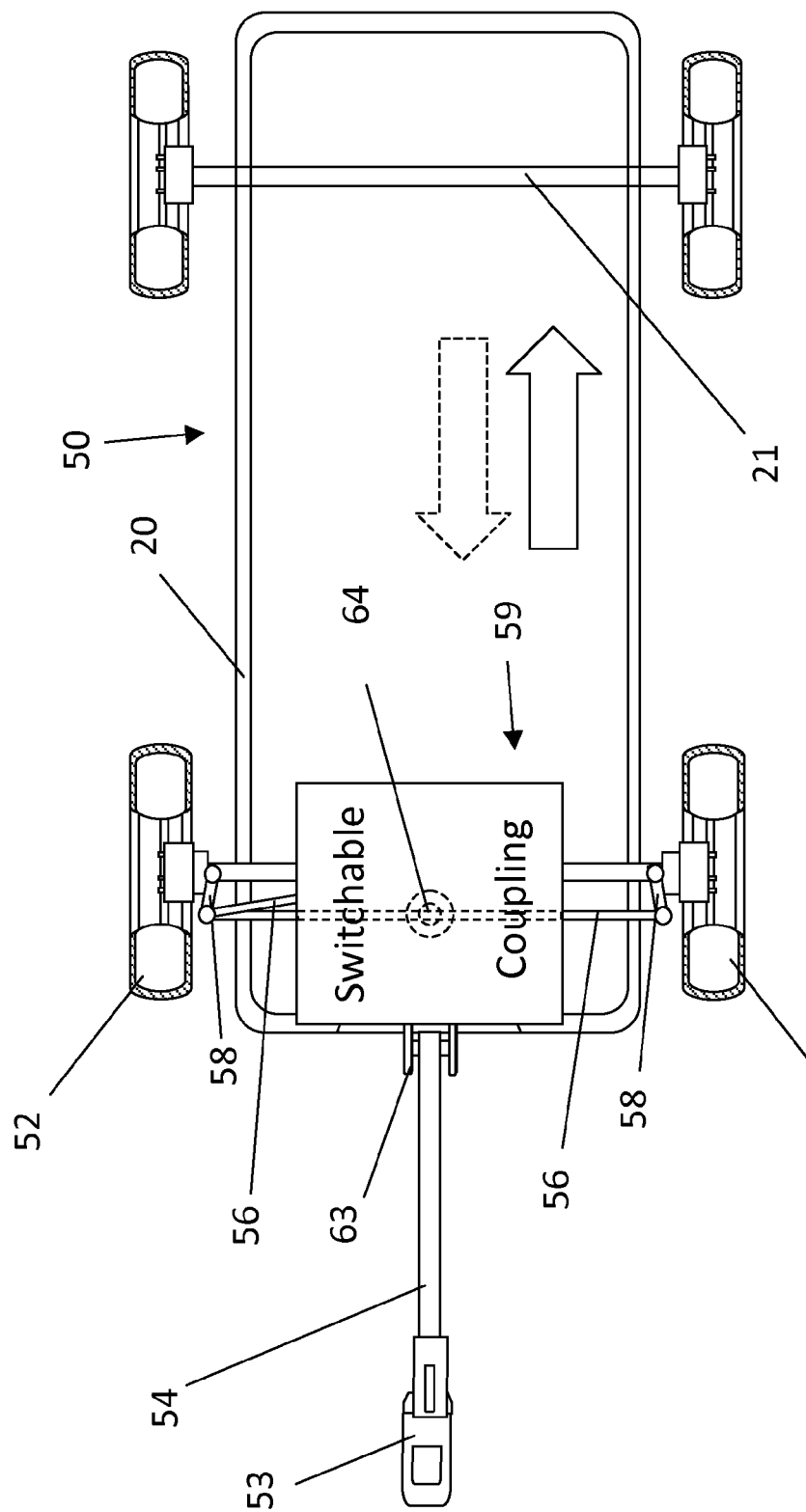
FIG. 6 is a diagrammatic illustration of a generic embodiment of the instant invention.

FIG. 5*c* shows operation of a trailer of the instant invention during a backing operation. Here, as the trailer is backed, if the trailer begins to "jacknife" during the backing process, sideways displacement of the towbar from a straight backing position will cause the front wheels to be turned in a direction opposite the displacement of the towbar, and proportional to the degree of displacement of the towbar at the pivot point of the towbar on the trailer. While switchable coupling 55 is shown constructed of a track and carriage, it should be apparent that numerous such arrangements can be envisioned. For instance, in some embodiments, a rack and pinion may be used, where the rack serves as slide 62 and a pinion operated by a hand crank is attached to the carriage. In other embodiments, a lever and dual-acting pawl arrangement may be mounted to carriage 60 for moving the carriage between the forward and rearward positions, with a rack mounted to track 62. In yet other embodiments, other arrangements can be envisioned wherein the carriage may be implemented as an exterior tubular member slidably fitted over a fixed interior tubular member, with conventional tie rod ends attached to the sliding exterior tubular member and interfacing to connecting rods 56. In any arrangement of the instant invention, and as shown in FIG. 6, a switchable coupling that may include a carriage or similar structure 59 is moved with respect to the pivot point of the towbar between a first position to one side of the pivot point where the steered wheels are steered in the direction the towbar is moved, and a second position to the other side of the pivot point where the steered wheels are steered in a direction opposite to movement of the towbar. Track 62 may be mounted to extend longitudinally with respect to the trailer, so that the carriage is moved between a front position and a rear position, or mounted perpendicular to the trailer so that the carriage is moved laterally with respect to the trailer.

Figure 7:
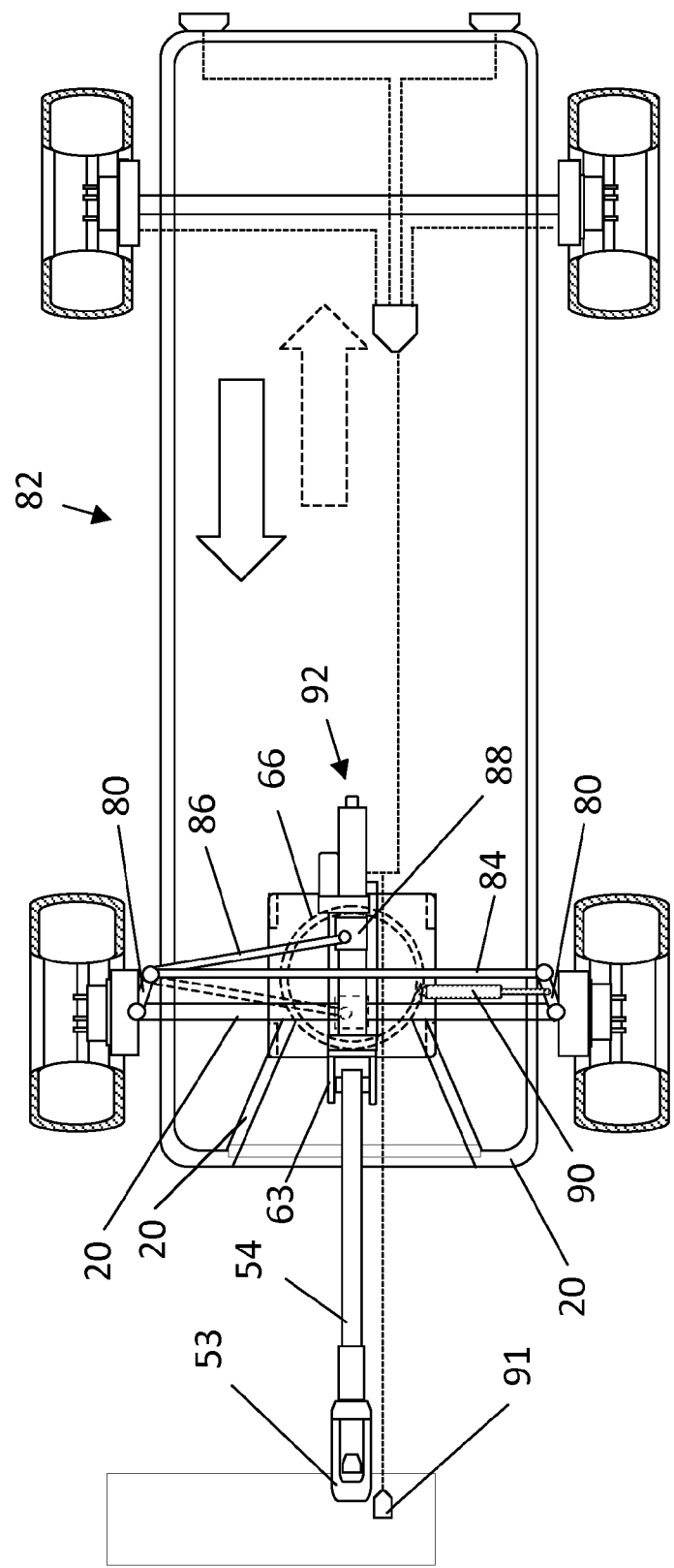
FIG. 7 is a diagrammatic illustration of another embodiment of the instant invention.
Figure 7A:
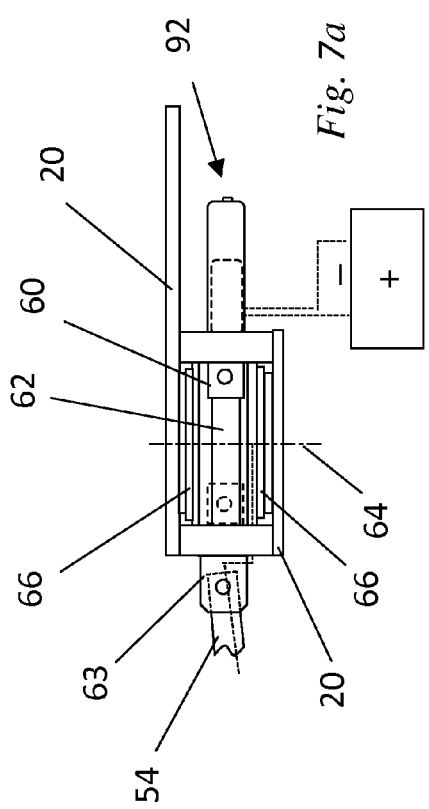
FIG. 7a is a diagrammatic illustration showing details of construction of the embodiment of FIG. 7.

FIGS. 7 and 7*a* illustrates an embodiment of the present invention wherein steering arms 80 (FIG. 7) are angled to provide Ackerman steering for a trailer 82. In this embodiment, a connecting rod 84 extends between steering arms 80, with a link 86 connected between the upper steering arm 80 and a carriage 88. A steering damper 90 may be provided in order to dampen any oscillatory movements that may develop during use. As noted above with respect to FIG. 5, a turntable 66 (FIG. 7*a*) is attached between front structural or frame members 20, with a track 62 attached to turntable 66. A carriage 88 as earlier described is adapted to slide along track 62, and to which link 86 (FIG. 7) is pivotally mounted at one end. The other end of link 86 is attached to a respective steering arm 80.

In another embodiment of the invention, and as shown in FIG. 7*a*, an electric linear actuator 92 is mounted to slide 62 in order to electrically move carriage 60 between the first, forward position wherein trailer 82 is steered when being towed (shown), i.e. the wheels are turned the same direction as sideways towbar displacement, and the second, rearward position wherein the trailer is being backed, i.e. the wheels are steered in an opposite direction to sideways displacement of the towbar. With this construction, and as noted above with respect to FIG. 5*a*, carriage 60 is moved across pivot axis 64 of the turntable approximately the same distance for the first position and the second position, with the first position and second position being at approximately equal distances from pivot axis 64. Conventional limit switches (not shown) may be used to limit the travel of carriage 60, and establish and adjust where the first position and second position are. Here, and with respect to all embodiments of the present invention, it may be found that the optimal distance of carriage 60 from pivot axis 64 may be somewhat different for the second position due to differences between steering the trailer when being towed, and steering the trailer when being backed.

Referring to FIG. 7, linear actuator 92 may be energized automatically, or manually using a three position switch, or a single switch for each direction. For automatically energizing the linear actuator, a SAE class-7 wiring connector 91 may be conventionally used to interface the electrical components of the trailer to the tow vehicle. Signals to the trailer from the tow vehicle comprise tail lights and brake lights, a signal for backing, which may be taken from the reverse or backup lights on the tow vehicle, and a fused 12V source. When a reverse signal is received, as indicated by the backup light signal being energized on the tow vehicle, a relay (not shown) is energized that couples 12 volt power to the motor on linear actuator 92, moving carriage 88 along slide or track 62 (FIG. 7a) to the second position. The relay is configured such that when the backing signal is removed, the linear actuator moves carriage 88 to the first position, although provisions may be made to lock the carriage in either the first or second position. Here, a simple disconnect switch to disconnect power to the linear actuator may be provided, and which locks the electrical linear actuator in the position it is currently in. Such a disconnect switch may be considered a safety feature during towing operations, as a reversing signal cannot be inadvertently applied to linear actuator 92 if it is completely disconnected from power. In this and all other embodiments, a mechanical safety may alternately or also be employed, such as a pin extending through carriage 88 and into slide 62, mechanically locking carriage 60 in place. A clamp or catch between carriage 88 and slide 62 may be similarly employed.

Figure 8:
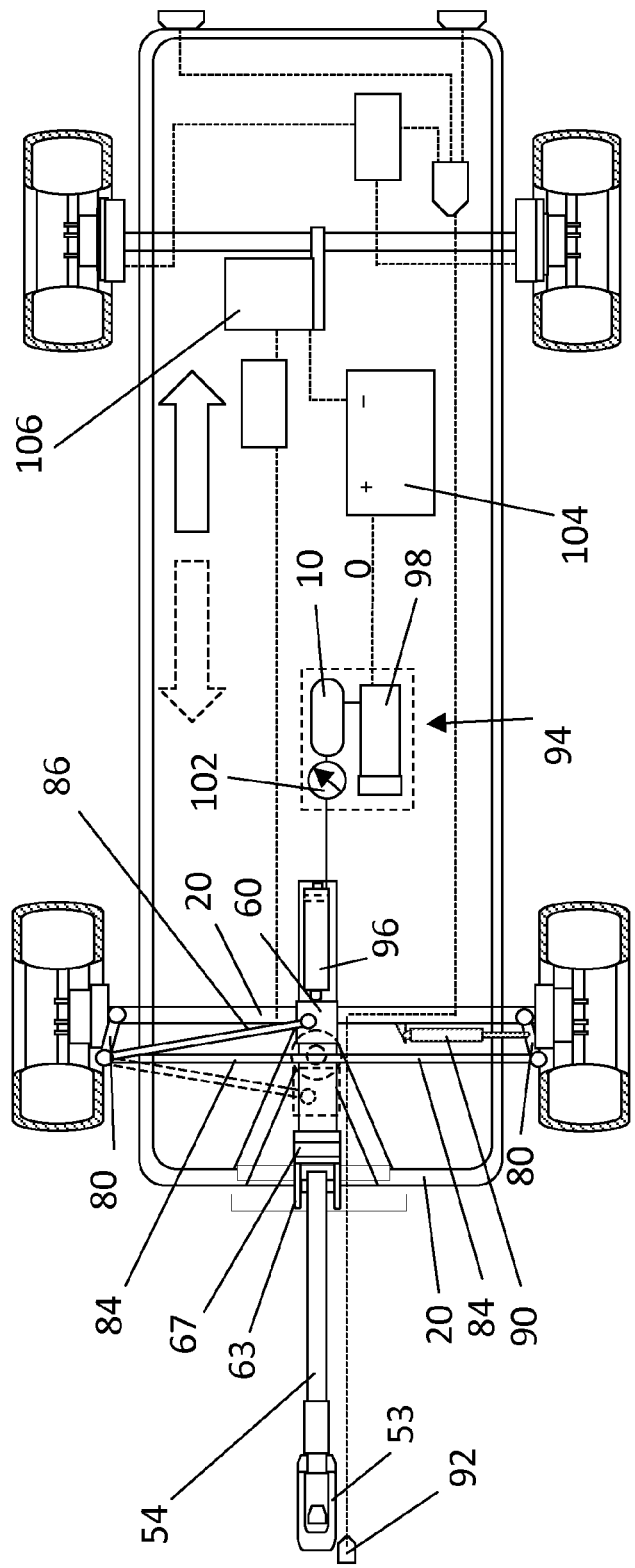
FIG. 8 is a diagrammatic illustration of another embodiment of the instant invention.

FIG. 8 shows an embodiment of the present invention wherein steering arms 80 are angled forward of the pivoting axis of the front wheels instead of being angled to the rear of the pivoting axis. This arrangement is known as an extended Ackerman steering wherein connecting rod 84 is forward of the steered axle. This causes functions of the forward position and the rearward position of carriage 60 to be reversed. In other words, the forward position of carriage 60 in FIG. 8 is the towing position for the trailer, and the rearward position of carriage 60 (shown) is the backing position for the trailer.

Figure 8A:
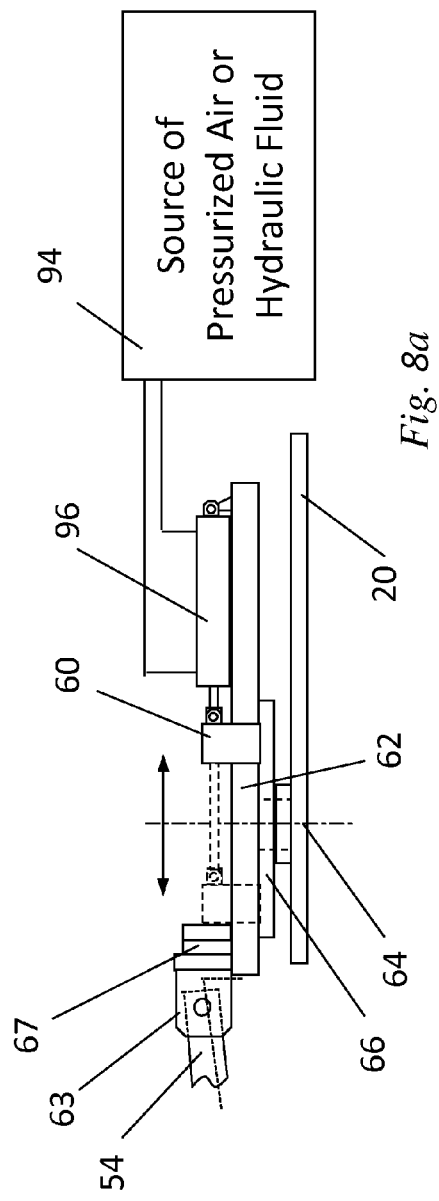
FIG. 8a is a diagrammatic illustration showing details of construction of the embodiment of FIG. 8.

FIG. 8 also illustrates an embodiment wherein a pneumatic or hydraulic source 94, as further illustrated in FIG. 8a, is used to operate a pneumatic or hydraulic cylinder 96, in turn connected to carriage 60, in order to move carriage 60 between the first position and the second position. Cylinder 96 may be a double-acting cylinder, or a self-returning cylinder wherein the cylinder is retracted or extended to a default position by a bias spring when pressure on the cylinder is released. In these embodiments, the default position would be the towing position. In some embodiments, source 94 may be provided by the tow vehicle, and in other embodiments may be provided by a source 94 mounted on the trailer, as shown FIG. 8. Here, an electrical motor and compressor/pump 98 would be provided, and, in the instance of a pneumatic system, be connected to a pressure tank 100. A pressure switch 102 would automatically energize motor compressor/pump 98 when pressure in tank 100 fell below a selected pressure. In the instance where a hydraulic system 94 is used, tank 100 would contain a reservoir of hydraulic fluid, and switch 102 would be used to energize motor 98 either manually or responsive to a backing signal, such as from a backing taillight as described above. Appropriate hydraulic connections would be made between motor/pump 98, reservoir 100 and cylinder 96. In some embodiments, an electrical storage battery 104 would be used to energize motor and compressor/pump 98, and be charged by electrical power from the tow vehicle. In other embodiments, motor and compressor/pump 98 would be energized and operated by electrical power directly from the tow vehicle. In some embodiments, battery 94 may be a battery pack similar to those found in electric vehicles, and also be used to power one or more reversible electric motors 106 coupled to the wheels of the trailer. In these embodiments, the trailer would at least be power assisted, and possibly self-powered. In the latter instance, an electrical generator would be provided and connected to battery pack 104. Such an electrical generator could be mounted on the trailer, towed on a separate trailer behind the main trailer or use an electrical power source from the tow vehicle, which itself may be a hybrid electric vehicle or a trailer tractor. In the former embodiments, this would allow a smaller tow vehicle to tow one or more larger trailers. In some embodiments, the hybrid tow vehicle would be equipped with extra electrical generating capacity specific for a self-powered or power assisted trailer of the instant invention.

In some embodiments, motor 106 (FIG. 8) may be activated and current adjusted thereto according to signals indicative of either of pull force (tension), such as from a load cell 67 or other load sensor, which may be integrated into towbar 54 or the switchable coupling mounted between the hitch connection to the tow vehicle and the tow bar pivot axis at the turntable. In other embodiments, load sensor 67 is combined with a wheel rotation sensor used to measure forward or reverse movement. When the trailer is moving forward, tension corresponds to a command for applying forward propulsion torque, and when the trailer is moving backwards, compression on the towbar and associated load cell corresponds to a command for applying reverse propulsion torque. Still in other embodiments, an acceleration sensor may be used, or some combination of load and acceleration may be used. Proportional, integral, differential (PID) control logic using wheel speed and either acceleration or load sensors may be used in both forward and reverse direction.

Figure 9:
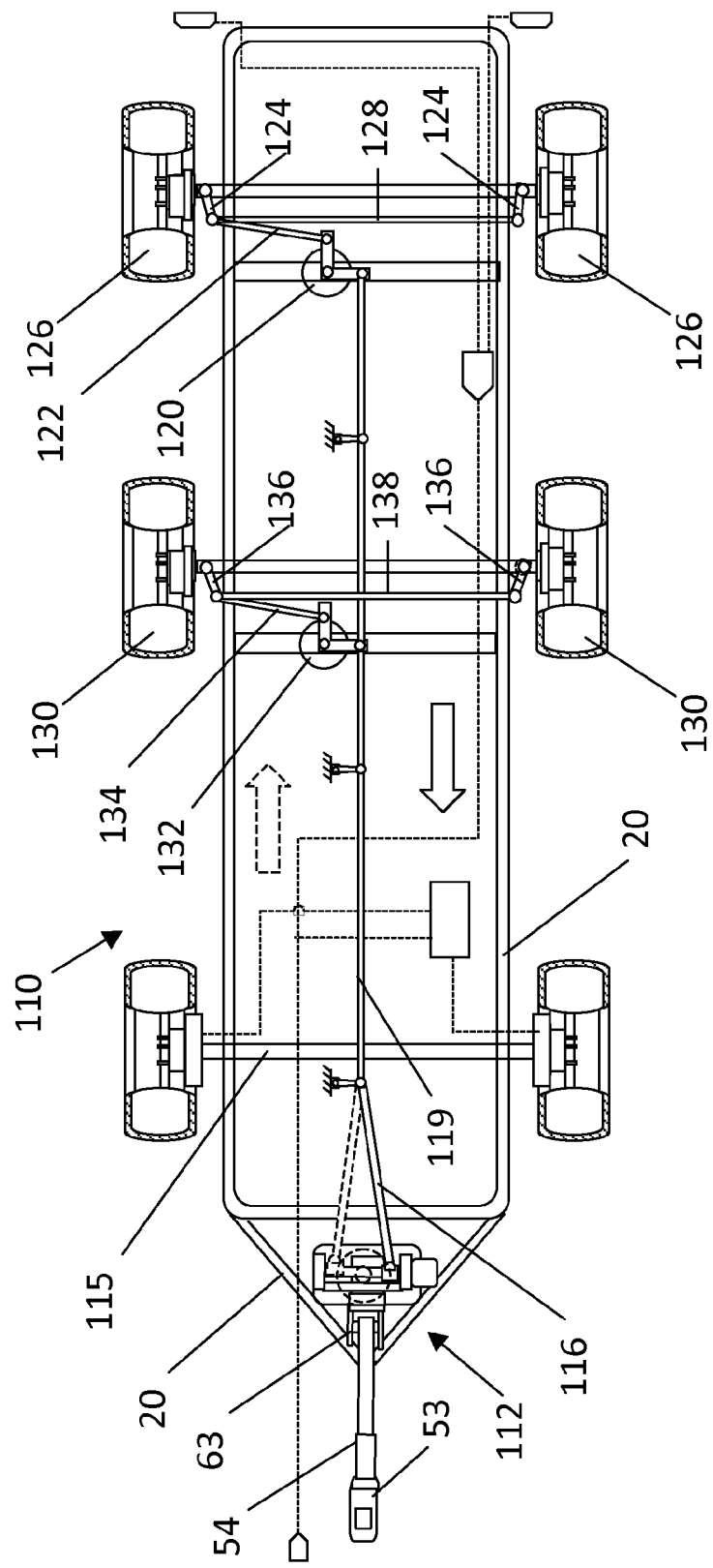
FIG. 9 is a diagrammatic illustration of another embodiment of the instant invention.

FIGS. 9, 9a and 9b shows a rear axle steered trailer 110 of the present invention. In this embodiment, a trailer with three axles is shown, with the middle and rear wheels being steered, whereas in other embodiments, the middle wheels and associated steering components may be removed. A switchable coupling 112 (FIG. 9a) is mounted as described above to a rotating turntable 114, in turn mounted, also as described above, to structural or frame members 20 (FIG. 9) at the front of trailer 110. The vertical pivot on turntable 114 (FIGS. 9a, 9b) is centered laterally on the chassis of the trailer, and is longitudinally forward of the front axle 115 (FIG. 9). Hitch receiver 53 and towbar 54 are attached to turntable 114 as described above, with towbar 54 engaging a clevis 63 in front of switchable coupling 112. An actuator rod 116 extends from a carriage 118 to at least one side of a rearward pivoting bellcrank or the like 120. A control rod 122 is attached at one end to the other side of bellcrank 120, with the other end of control rod 122 attached to steering arm 124 of rear wheel 126. A connecting rod 128 connects both steering arms 124 together, so that when steering rod 119 is pulled or pushed, control rod 122 acts on the steering arm of the top wheel, which in turn moves the lower wheel via rod 128.

Also as shown in FIG. 9, in some embodiments, a center pair of wheels 130 may be provided and steered, as by a second bellcrank 132 connected at one side to steering rod 119. A second control rod 134 attached at one end to the other side of bellcrank 132 is connected at the other end to a steering arm 136 of the top wheel 130, with a second connecting rod 138 connected between steering arms 136 of wheels 130. As with wheels 126, pulling or pushing actuator rod 116 causes the second control rod 134 to move wheels 130. In some embodiments, wheels 130 may be close to rear wheels 126, such as the dual rear wheels found on a trailer pulled by a semi tractor. In this instance, bellcrank 132 may be the same size or perhaps slightly smaller than bellcrank 120 in order to more closely maintain a common center of turning between Ackerman steering relationships associated with wheels 126 and wheels 130. In other instances, where a wheel axle is mounted more toward the longitudinal center of the trailer, as shown in FIG. 9, bellcrank 132 may be substantially smaller than bellcrank 120, generally proportional to the distance between the respective bell cranks and the fixed axle 115.

As shown in FIGS. 9a and 9b, carriage 118 is operated by a leadscrew 140, in turn operated by an electric motor 142. Slide 144 is mounted to turntable 114 and generally centered over the pivot axle or pivot point for towbar 54 as described above, with slide 144 being mounted perpendicular to towbar 54. During operation, carriage 118 is moved to the first position for towing wherein carriage 118 is in the upper position (dashed lines in FIG. 9), and moved to the second position for backing as shown in FIGS. 9 and 9a. As noted above with respect to FIG. 8, a pneumatic or hydraulic system 94 and appropriate pneumatic or hydraulic cylinders may be used instead of an electric linear actuator to move carriage 118 between the first position and second position. Trailer braking may be implemented by any conventional system.

FIG. 9 shows reverse operation mode of the trailer wherein the actuator carriage 118 is in the second, or lower, position of the rotatable turntable 114, so that bellcranks 132, 120 are turned to steer wheels 126, 130 in the opposite direction with respect to sideways movement of the tow bar. In the towed mode (dashed lines), linear actuator carriage 118 is moved to the first, or upper, position of the turntable, so the bellcranks 120, 132 and steered wheels 126, 130 are steered in the same direction as sideways movement of the tow bar 54. Reverse operation may be activated when the class 7 trailer wiring connector 146 receives a reverse signal, such as from backup lights of the tow vehicle, and triggers a relay (not shown) that engages 12V fused power from the trailer wiring connector to energize motor 142 (FIG. 9a) on the electric linear actuator that moves the linear actuator carriage 118 between the first position and second position. Also as described above, turntable 114 and carriage 118 would be ruggedized, meaning that a dovetail slot or T-shaped slot may be cut lengthwise into sides of the slide, with a matching dovetail or t-shaped fitting on carriage 118 slidably fitting into respective slots. Other ways of ruggedizing slide 144 and carriage 118 should also be apparent, such as carriage 118 constructed as a first tubular member that slides over a second, slightly smaller tubular member. In other embodiments, actuator rod 116 would be mounted to carriage 118 so that compression and tension loads of actuator rod 116 are applied to sides of slide 144 through the carriage. These embodiments would prevent steering loads on actuator rod 116 from being applied directly to leadscrew 140, which would cause premature wear on the threads and bearings of the leadscrew and carriage.

Figure 10:
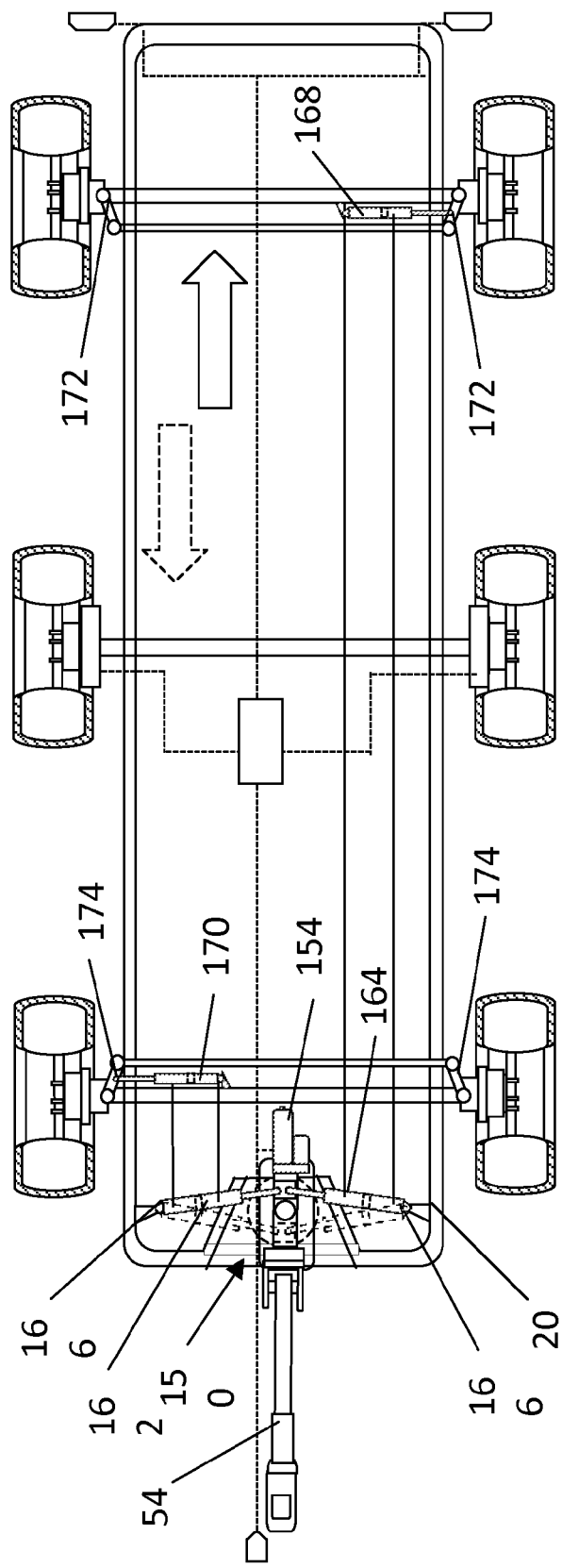
FIG. 10 is a diagrammatic illustration of another embodiment of the instant invention.

FIGS. 10, 10a, 10b and 10c illustrate a system similar to that of FIG. 9, except rather than using a control actuator rod 116 and bellcranks and linkages to physically steer the wheels, master and slave hydraulic cylinders are used. As shown in FIG. 10, a turntable and slide/carriage assembly 150 is mounted with the slide extending generally along an axis of towbar 54, with the carriage 152 (FIG. 10a) being moved by, in this case, an electric linear actuator 154 between the first position of carriage 152 for towing (dashed lines), and the second position of carriage 152 for backing (solid lines). In FIG. 10a, the slide and carriage assembly 150 is mounted perpendicular to towbar 54. In both FIGS. 10 and 10a, as with other embodiments disclosed herein, a center of slide 156 is generally centered over pivot 158 for towbar 54. With these constructions, and in FIG. 10, the carriage is moved toward the front for the first, towing position (dashed lines), and toward the rear for the second, backing position (solid lines). With respect to the arrangement shown in FIG. 10a where a single master cylinder is used, and which pivots about a pin or the like 160, and with the center of the slide mounted generally over the pivot 158 and with the slide 156 generally perpendicular to the towbar, the first, towing position is the lower, dashed line position, and the backing position is the upper position shown in solid lines.

Referring to FIG. 10c, double acting master hydraulic cylinders 162, 164 are each hydraulic cylinders mounted so that their hydraulic pistons are each generally centered in respective cylinders when the towbar is in a straight ahead position, as shown in FIG. 10. Similarly, the slave cylinders 168, 170 are double acting cylinders mounted so that the pistons thereof are generally centered in respective cylinders when the towbar is in the straight ahead position as shown in FIG. 10. Significantly, the rear hydraulic flow from master cylinder 162 is connected to the front of cylinder 170, with the hydraulic flow from the front of master hydraulic cylinder 162 connected to the rear of slave cylinder 170. Likewise, the rear hydraulic flow of master hydraulic cylinder 164 is connected to the front of hydraulic cylinder 168, with the hydraulic flow from the front of master hydraulic cylinder 164 being connected to the rear of hydraulic slave cylinder 168. Double acting master cylinders 162, 164 are mounted at respective ends 166 in pivoting relation to a pin (not shown), in turn set in a clevis-type mount or the like attached to a structural frame member 20. Double acting slave cylinders 168, 170 are similarly mounted, with their pushrods connected to steering arms 172 at the rear wheels of the trailer, and 174 at the front of the trailer, respectively. The front slave cylinder 170 is connected to the upper front wheel, and the rear slave cylinder 168 is connected to the lower rear wheel, so that the front wheels and rear wheels are steered in opposite directions, causing the front wheels and rear wheels to track accurately when the trailer is turned. With this construction and hydraulic connections, and with carriage 152 in the rearward position shown in FIG. 10, when the tow bar is moved sideways, such as upward, then the pushrod of master cylinder 162 is drawn out of its cylinder while the pushrod of master cylinder 164 is pushed into its cylinder. This forces hydraulic fluid from the front of master cylinder 162 into the rear of slave cylinder 170, pushing the slave cylinder rod out of the cylinder and moving steering arm 174 outward, turning the front wheels counterclockwise and counter to the direction towbar 54 is moved. Simultaneously with upward movement of towbar 54, the push rod of master cylinder 164 is pushed inward, forcing hydraulic fluid from the rear of master cylinder 164 and into the front of slave cylinder 168, which pushes the push rod of slave cylinder 168 inward, which pulls on steering arm 172 and turns the rear wheels in a clockwise direction. This would effectively steer the trailer when being backed.

For towing the trailer of FIGS. 10 and 10c, carriage 152 is moved by using any of the previously disclosed methods to the first, forward position (dashed line). Here, when towbar 54 is moved upward in FIG. 10, the hydraulic piston in master cylinder 162 is forced inward, forcing hydraulic flow from the rear of hydraulic cylinder 162 to the front of slave cylinder 170, causing its pushrod to be forced inward and pulling steering arm 174 to move the front wheels in a clockwise direction along with clockwise movement of the towbar. Simultaneously, the pushrod of master cylinder 164 is drawn out of its hydraulic cylinder, forcing fluid from the front of master cylinder 164 and into the rear of slave cylinder 168.

This forces the pushrod outward from slave cylinder 168, turning the rear wheels in a counterclockwise direction. This arrangement would steer the trailer of FIG. 10 when being towed in a forward direction.

While a trailer with three axles is shown in FIG. 10, it should be apparent that a two axle trailer having at least one axle in the front and at least one axle in the rear can also be steered in forward and reverse directions using hydraulic master and slave cylinders as described. Further, while a four wheel hydraulic steering system is disclosed, it should also be apparent that such a system can also be used to steer just the front wheels of a trailer in forward and reverse directions, with the rear wheels being fixed. In addition, rather than using an electric linear actuator, a hydraulic or pneumatic actuator as disclosed herein may also be used to move carriage 152 between the first, towing position and the second, backing position. Also, a manual system may be used to move the carriage between the first and second positions.

FIG. 10*a* illustrates a similar system to that shown in FIG. 10, except a single double acting master cylinder 180 is used, and mounted at its rear to a pivoting clevis and pin 160, in turn mounted to a structural support 20. In this embodiment, slide 156 is mounted perpendicular to towbar 54. A carriage 152 is moved laterally over a pivot pin or bearing 158 between a first position and second position with respect to the trailer, where the first position (dashed lines) is a towing position, and the second position (solid lines) is a backing position. In the embodiment shown, a linear actuator 154 may be used to move carriage 156 between the first position and second position of the cylinder position as described above, or a hydraulic or pneumatic system may be used. Of course, a manual crank or lever system may be used, as described for FIG. 5. In the embodiment of FIG. 10*a*, in the towing, dashed line position of double acting hydraulic cylinder 180, when the towbar is moved upward, hydraulic fluid is forced out the front of cylinder 180, and which may be connected to the front of slave cylinder 170. This would force the pushrod for slave cylinder 170 inward, pulling on steering arm 174 and moving the front wheels of the trailer in the same direction as movement of the towbar. In the backup position shown in solid lines, the reverse action would occur, as when towbar 54 is moved upward, fluid would be forced from the rear of cylinder 180 and connected to the rear of slave cylinder 170, which would turn the front wheels in opposition to towbar movement. As described, an electric linear actuator 154 may be energized by any method as described above in order to move carriage 152 between the first, dashed line position for towing and the second, solid line position for backing.

For steering the rear wheels in addition to the front wheels using a single master cylinder, the master cylinder would be sufficiently large in order to operate two smaller slave cylinders connected so that the front and rear wheels are appropriately steered, with appropriate proportional valving so that the hydraulic fluid forced from the master cylinder is proportionally divided between the front and rear slave cylinders. Otherwise, less hydraulic fluid may be applied to a slave cylinder at a heavier end of a trailer and more fluid applied to a slave cylinder at a lighter end of a trailer.

Figure 11:
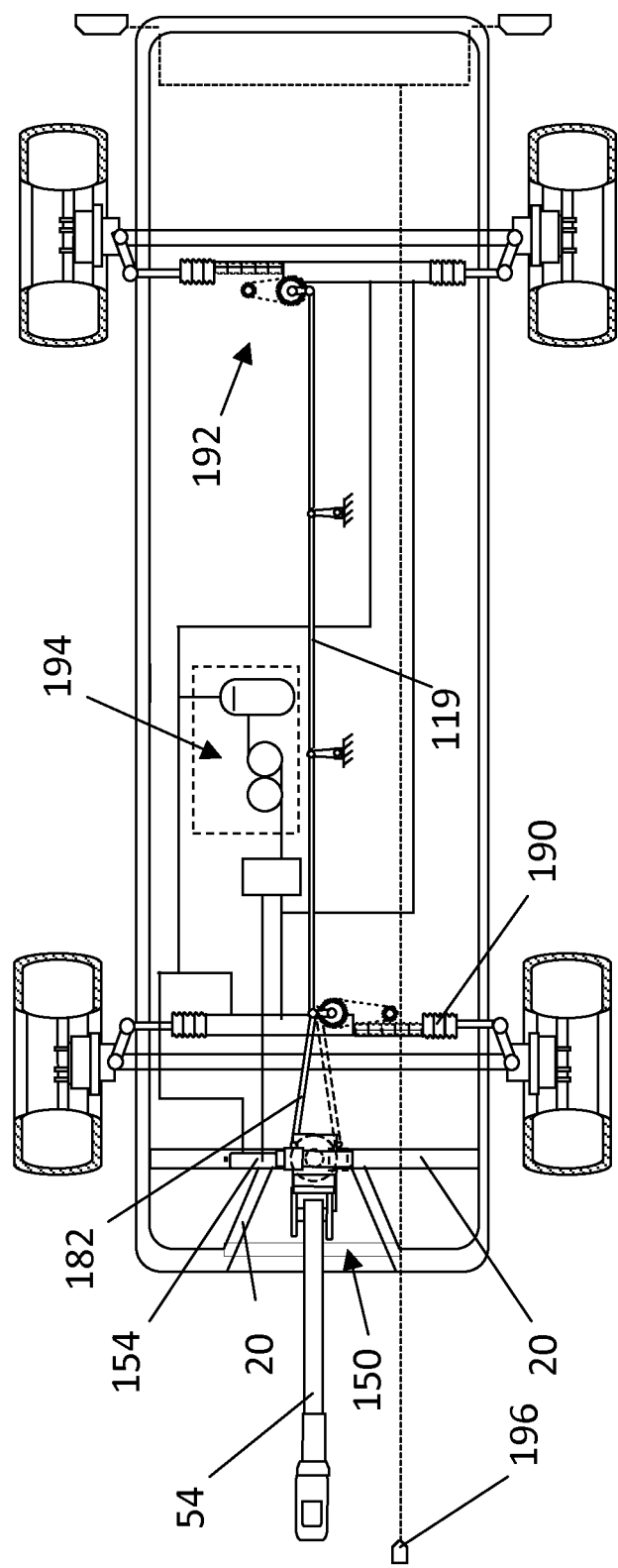
FIG. 11 is a diagrammatic illustration of another embodiment of the instant invention.

FIGS. 11 and 11*a* illustrate a trailer of the instant invention wherein a turntable and slide assembly 150 as shown and described for FIG. 10*a*, and which also has a carriage 152 (FIG. 11*a*) operated by an electric linear actuator 154, and which is moved on a slide 156 between a first, towing position shown in dashed lines, and a second, backing position shown in solid lines. An actuator rod 182 is connected at one end to carriage 152, and connected at the other end to a lever 184. Lever 184 in turn moves a pulley, sprocket, gear or the like 186 that operates, as by a belt, synchronous belt, chain or gearing (not shown), an input shaft 188 of a power steering unit 190 FIG. 11). It is anticipated that power steering unit 190 may be modified to interface directly with actuator rod 182 or transfer bar 119, such as by a lever or bellcrank of an appropriate length so that steering is proportional to towbar displacement. As such, when carriage 152 is in the dashed line position, sideways movement, (upward in FIG. 11*a*) of towbar 54 moves sprocket or gear 186 in a counterclockwise direction, in turn moving at least the front steered wheels in the same direction as towbar movement. When carriage 152 is moved to the second position for backing, the same upward movement of towbar 54 moves sprocket or gear 186 in a clockwise direction, moving at least the front steered wheels in opposition to sideways movement of towbar 54. As shown in FIG. 11, a similar steering arrangement 192 may be provided at the rear of the trailer, with a second power steering unit operated by a pulley, sprocket, gear or the like arranged to steer the rear wheels in an opposite direction to the front wheels. In other words, where the front wheels are turned clockwise, the rear wheels are turned counterclockwise to accurately steer around a corner. Power to drive a power steering pump and reservoir 194 may be obtained by using an electrical motor connected via hitch connector 196 to the tow vehicle electrical system, which may also carry a backup signal to move carriage 152 to the backup position as earlier described.

Figure 12:
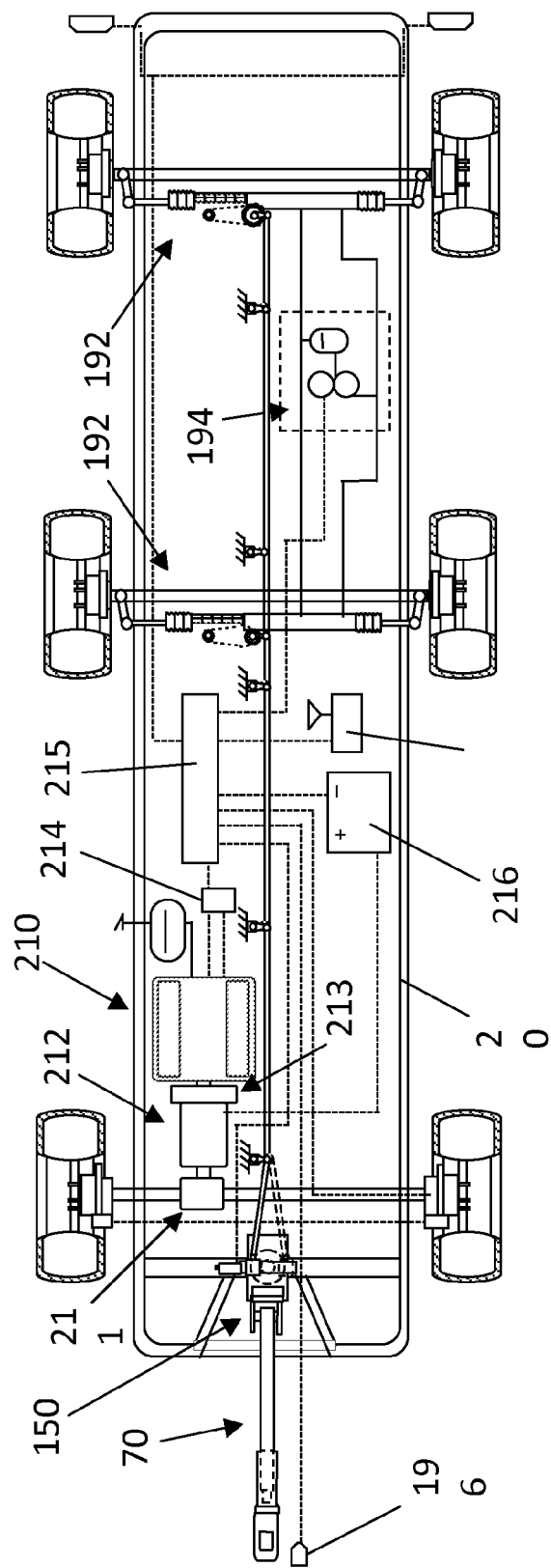
FIG. 12 is a diagrammatic illustration of another embodiment of the instant invention.
Figure 12B:
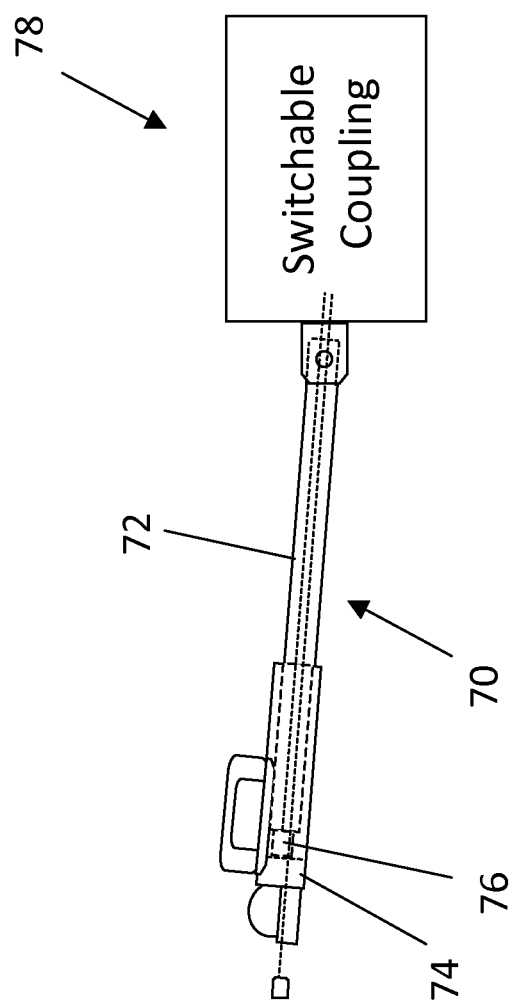
FIG. 12b is a diagrammatic illustration of one embodiment of a towbar of the instant invention.

FIG. 12 is an embodiment of a self-powered trailer, or at least a trailer that is power assisted, and steered by the rear wheels. In this embodiment, an internal combustion engine 210 powers the trailer through a transmission 212 as commanded by microprocessor 215. As shown in FIG. 12*b*, a towbar 70 comprises tubular members 72 and 74, where member 74 has a slightly larger inside dimension than an outside dimension of member 72. Tension and compression load cell 76 is fixedly attached to both tubular members 72 and 74, and connected to microprocessor 215, which controls power provided by engine 210 in accordance with compression/tension on towbar 70, as described for FIG. 8. In other embodiments, rather than a transmission, an electrical generator coupled to engine 210 may be used to drive electrical motors 214 mounted to drive at least two of the trailer wheels. In some embodiments, the engine/generator may be similar to those found in hybrid systems, with a battery pack 216 for providing power for short movements of the trailer without connecting it to a tow vehicle. Regenerative braking may be used to recover electrical power during braking.

Figure 13:
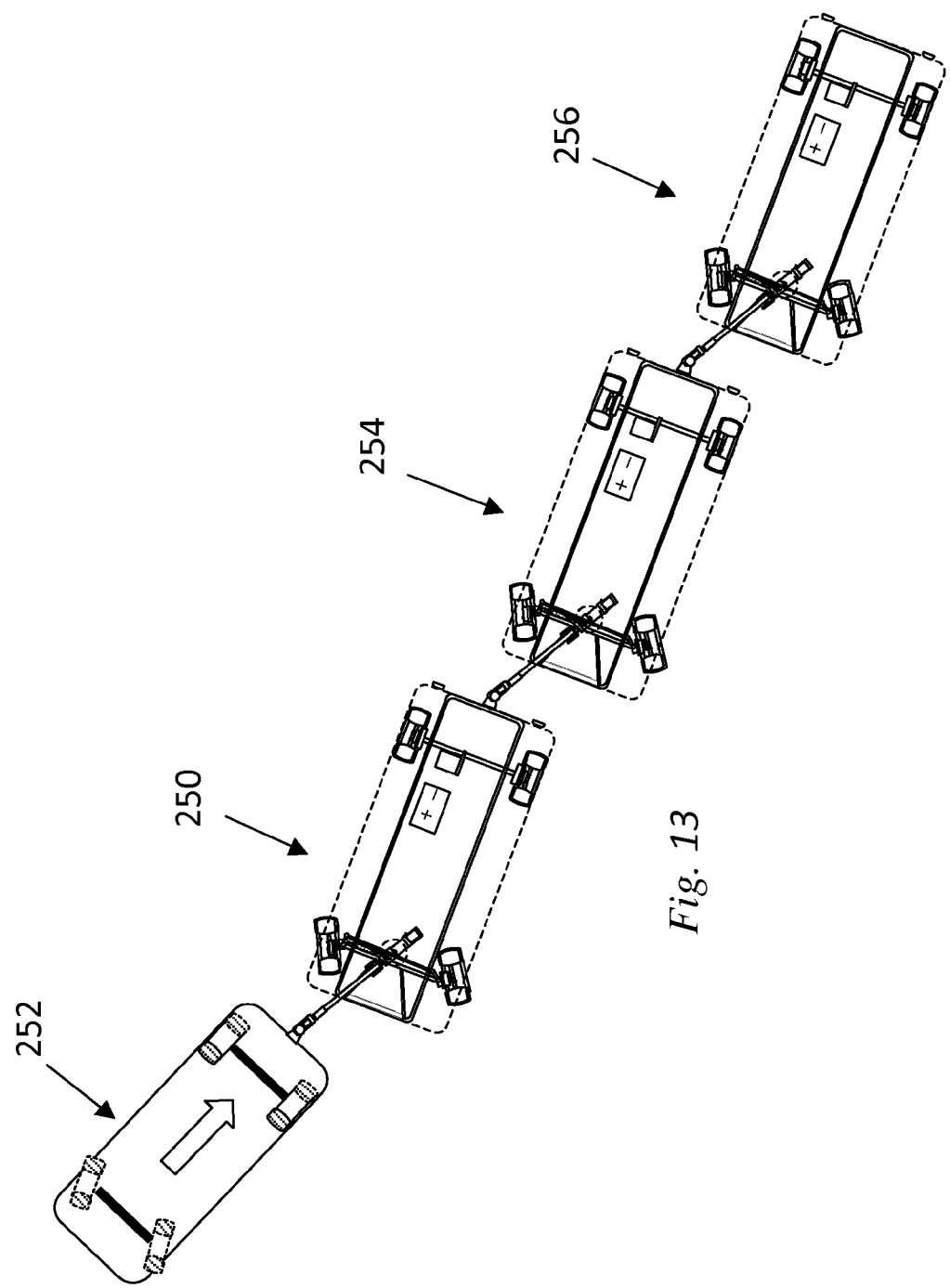
FIG. 13 is a diagrammatic illustration of how several trailers of the instant invention may be connected together.

FIG. 13 is one example of how a plurality of trailers may be attached together in a string or train of trailers capable of backing without jackknife. Here, a lead trailer 250 is attached by its respective towbar to a tow vehicle 252. Successive trailers 254 and 256 are attached as shown to trailer 250. Trailers 250, 254 and 256 may be any of the trailers as disclosed, and electrically connected together by their own brake lights, running lights and backup lights. Where the backup light on the tow vehicle is used to switch between the first, towing position to the second backing position, the backup light signal would be communicated to each of the trailers by coupling their respective hitch connectors together. The wiring of each trailer would also be provided with a connector at the rear for connecting to a connector at the front of a following trailer.

FIGS. 14 and 14*a* show an embodiment 350 of the present invention with electronic, fly by wire steering. Sensor 330 measures the wheel steering angle (WSA) and sensor 331 measures tow bar steering angle (TSA) as shown in FIG. 15, and a microprocessor 315 generates signals to a hydraulic power supply 333 comprising an electronically controlled valve manifold, fluid reservoir, pump and motor, which supplies the hydraulic steering cylinder 335 to maintain the desired WSA.

It is anticipated that various control schemes will be implemented, but all change the steering direction to the opposite direction when in reverse mode, and for both forward and reverse operation, a proportional relationship between TSA and WSA is maintained for safe and stable operation.

Electronic coupling is inherently switchable whereby upon receipt of reverse trigger signal from the trailer wiring connector 392 or load sensor 367 embedded in the tow bar between tow vehicle hitch receiver 353 and clevis 366 with pin P, or a pendulum acceleration sensor as is common in trailer braking systems. The microprocessor 315 sends valve commands to the hydraulic manifold 333 which produces necessary steering force using hydraulic fluid pressure through the hydraulic cylinder 335 that steer the wheels in the opposite direction, still generally proportional as compared to the TSA. Upon removal of the reverse trigger, the hydraulic cylinder steers the wheels so the WSA is the proper function of TSA.

Referring again to FIG. 14, on the forward end of tow bar 354 the handle for manual operation comprises a tow vehicle hitch receiver 353. Tow bar 354 comprises a horizontal pin P (FIG. 14) at the aft end, attached to a first clevis 363, allowing up and down rotation of tow bar 354, the clevis 363 welded onto a vertical pin P FIG. 14a) attached to a second clevis 366 mounted on the lateral center of the chassis 320 and longitudinally at the front of the trailer, forward of the front axle. The vertical pin P and chassis mounted clevis 366 further comprises an electronic pivot sensor 331 providing tow bar steering angle (TSA) for control input. The wheels of the steered axle comprise wheel steering angle (WSA) sensors 330 for control input. Ackerman steering relationship and chassis, 320, are as discussed previously.

An electronic microprocessor receives the TSA and WSA sensor inputs and generates force commands to a hydraulic power supply assembly (motor and valve manifolds) which supplies fluid power to a steering actuator 335 which connects on one end to the trailer chassis 320 and on the other end with a steering arm 322, which turns wheels 340. The commands from the microprocessor 333 are for the new value of WSA, based on the measured state of TSA and an appropriate control relationship. Reverse operation is signaled by one of the following: an SAE Class-7 trailer wiring connector 392, a manual reverse signal transmitted by the operator using a remote control through antenna 337, or load sensor or acceleration sensor as discussed previously. Those inputs are provided to a microprocessor 315 which, in reverse mode, control WSA to be the opposite direction, proportional to the measured TSA. It is anticipated that Proportional Integral Differential (PID) and other control algorithms will be used, though a simple proportional relationship is sufficient for well-behaved operation.

The location of the tow bar attachment point to the chassis is more flexible with the electronic steering embodiment, though there are preferred locations that generate less torque on the trailer chassis by aligning the pull force in the tow bar with the instantaneous velocity vector.

In FIG. 15, the WSA as a function of TSA is given for optimum performance at slow turning speeds: tow bar force is applied tangent to the trailer center of turning, and in the direction of the instantaneous velocity vector of the trailer. If the two vectors are not aligned when traveling in forward mode, then there will be a resultant torque imparted on the trailer chassis during a turn. Given the known values for W/2, L2, L3, WSA is calculated as a function of TSA and the trailer geometry.

$$TAN(TSA)=L2/(W/2+L3);$$

$$\Rightarrow (W/2+L3)\ TAN(TSA)=L2$$

$$\Rightarrow L2-W/2\ TAN(TSA)=L3\ TAN(TSA)$$

$$\Rightarrow L3=(L2-W/2\ TAN(TSA))/TAN(TSA)$$

And $$\Rightarrow TAN(WSA)=L1/L3;\ \text{So therefore,}$$

$$\Rightarrow WSA=TAN^{-1}[L1\ TAN(TSA)/(L2-W/2\ TAN(TSA))]$$

By taking a range of positive values for TSA and calculating corresponding WSA values, the calculated average WSA/TSA is the proportionality constant that aligns the pull force with the instantaneous velocity of the trailer minimizing tow bar induced torques during turning.

Figure 16:
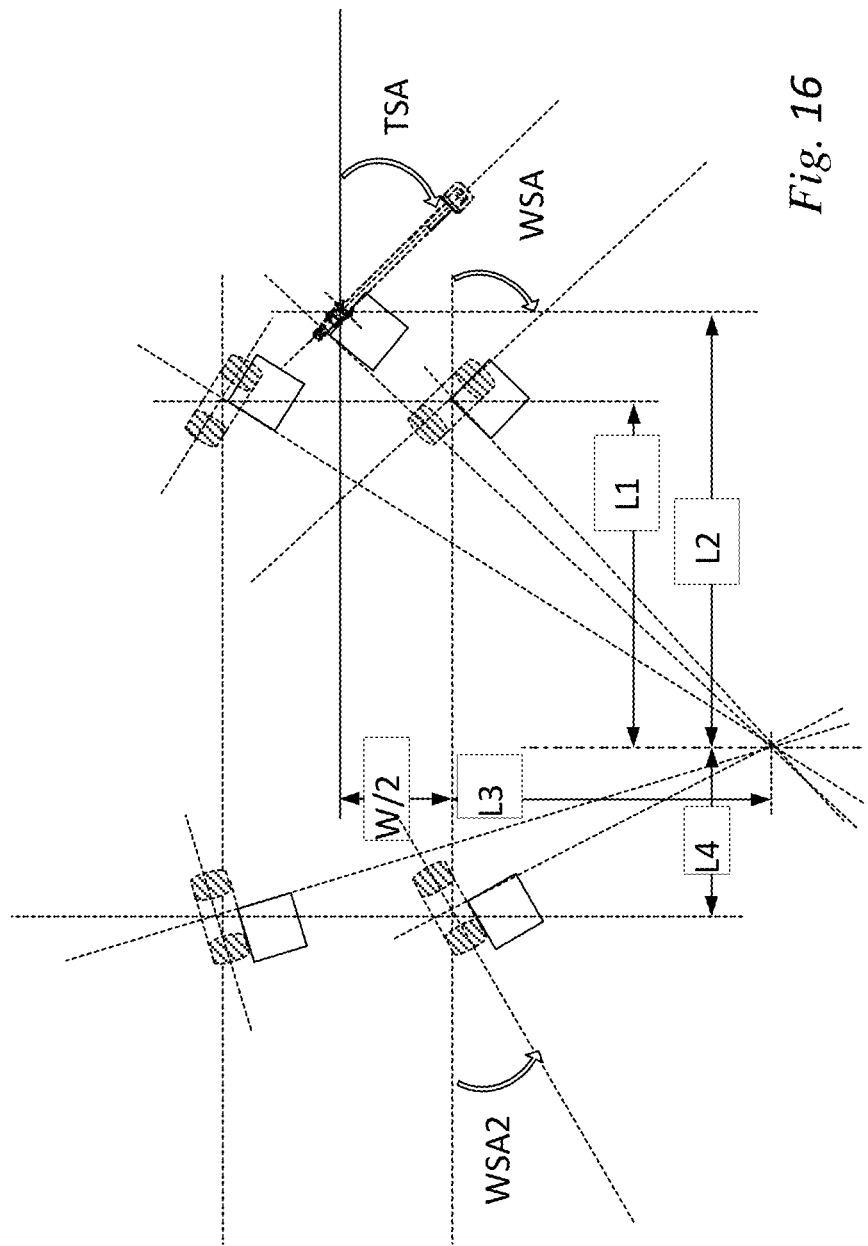
FIG. 16 is an illustration of calculations for opposed steering mechanisms.

FIG. 16 shows similar calculations for opposed steering mechanisms whereby the front and rear steering, both controlled by tow bar angle, maintain a common center of turning, where WSA1 is calculated the same as in FIG. 15, WSA2 is the rear axle steering angle, and it is calculated as follows:

$$\Rightarrow TAN(WSA2)=L4/L3;$$

$$\Rightarrow WSA2=TAN^{-1}[L4\ TAN(TSA)/(L2-W/2\ TAN(TSA))]$$

It is anticipated that for the electronically steered embodiments, the center of turning that defines L4 and L2 in FIG. 16 can be actively updated as part of guidance commands to improve steering behavior if connection rod 384 (FIG. 14) is of controllable length as described in prior art.

Minimum tow bar induced torque during turning is only one of several considerations in locating the optimum attachment point for the tow bar in electronic, fly-by-wire systems. In reverse operation, the direction of the applied tow bar force and the instantaneous velocity of the attach point are very different out of necessity in preventing jackknife, and results in negligible if any additional tire wear. Range of motion of tow bar and steered wheels, tow bar stowage, are important considerations that factor into the placement of the tow bar attach point on electronic steering embodiments.

In addition, embodiment 350 comprises an antenna for receiving manual commands from the operator and a load cell 367 embedded in the tow bar 354 whereby the operator uses a remote control 368 to send a reverse command signal to the trailer antenna 337 and the trailer antenna sends the reverse command to the microprocessor 315 and the microprocessor changes the steering commands so hydraulic steering cylinder 335 steers the steered wheels 340 to the opposite direction with the same or similar magnitude; and also comprises a load cell 367 sending a signal to the microprocessor 315, the microprocessor sending a steering command to the hydraulic power supply 333, which supplies hydraulic power to the hydraulic steering cylinder 335, forcing the wheels back so the tow bar and wheels are in the same direction, proportional to the tow bar, and then the microprocessor back when in forward mode.

While specific implementations have been described herein, it is apparent that the various components of my invention can be combined in different combinations and in different modalities. For example, those embodiments that use master and slave hydraulic cylinders can be connected differently than described herein, but which still function to steer a trailer in both forward and reverse directions. Likewise, mechanical embodiments can be envisioned that, while not specifically as described herein, still function in the same manner as my invention.

Having thus described my invention and the manner of it use, it should be apparent to those of average skill in the relevant arts that incidental changes may be made thereto that fairly fall within the scope of the following appended claims, wherein I claim:

The invention claimed is:

1. A trailer steering system comprising:
   a conventional, unmodified trailer hitch receiver on a tow vehicle,
   a tow bar having a conventional, unmodified trailer hitch at one end and configured to removably connect to said conventional, unmodified trailer hitch receiver of said tow vehicle,
   a switchable coupling connected to the other end of said towbar, said switchable coupling having a pivot axis mounted to said trailer about which said switchable coupling pivots in horizontal pivoting relation with respect to said trailer responsive to sideways displacement of said towbar as said trailer is being towed or backed, said switchable coupling further comprising a carriage movable through said pivot axis between a first position selected to steer steered wheels of said trailer when said trailer is moving in a forward direction, and a second position selected to steer said steered wheels of said trailer when said trailer is being backed,
   at least one steering link coupled between said switchable coupling and a steering arm of steered wheels of at least one axle of said trailer.

2. A trailer steering system as set forth in claim 1 wherein said carriage includes at least one mounting point for said at least one steering link.

3. A trailer steering system as set forth in claim 2 wherein said switchable coupling further comprises a slide mounted to said towbar, with said carriage movably mounted to said slide so that said carriage is moved between said first position and said second position with respect to said towbar.

4. A trailer steering system as set forth in claim 3 wherein said slide is mounted parallel with a long axis of said towbar.

5. A trailer steering system as set forth in claim 3 wherein said slide is mounted perpendicular to a long axis of said towbar.

6. A trailer steering system as set forth in claim 3 further comprising an actuator mounted to move said carriage between said first position and said second position.

7. A trailer steering system as set forth in claim 3 wherein said at least one steering link further comprises at least one steering rod connected at one end to said at least one mounting point on said carriage, and coupled at an opposite end to said steering arm of said steered wheels of at least one axle.

8. A trailer steering system as set forth in claim 3 wherein said at least one steering link further comprises a hydraulic master cylinder connected to said at least one mounting point on said carriage, and coupled via hydraulic lines to a respective slave cylinder coupled to said steering arm of said steered wheels of at least one axle.

9. A trailer steering system as set forth in claim 3 further comprising a power steering unit having a control input coupled to said at least one mounting point on said carriage and coupled to said steering arm of said steered wheels of said at least one axle.

10. A trailer steering system as set forth in claim 3 further comprising a second steering link coupled between said switchable coupling and a second steering arm of a second steered wheel of said trailer, said second steered wheel being on a different axle as said at least one axle, so that steerable wheels on different axles of said trailer are steered by said switchable coupling.

11. A trailer steering system comprising:
    a trailer hitch on said tow vehicle,
    a tow bar connectable at one end to said trailer hitch,
    a pivot axis on said trailer,
    a switchable coupling mounted in pivoting relation about said pivot axis, said switchable coupling comprising a carriage movable between a first position on one side of said pivot axis and a second position on an opposite side of said pivot axis, with the other end of said towbar coupled to said switchable coupling,
    at least one steering link coupled between said carriage and steered wheels of said trailer,
    whereby with said carriage positioned at one of said first position and said second position, said steered wheels are steered in the same direction as sideways towbar displacement, and with said carriage positioned at the other of said first position and said second position, said steered wheels are steered in an opposite direction as said sideways towbar displacement.

12. A trailer steering system as set forth in claim 11 wherein said switchable coupling further comprises a slide along which said carriage is moved between said first position and said second position, said slide mounted in pivoting relation about said pivot axis.

13. A trailer steering system as set forth in claim 12 wherein said first position and said second position on said slide are at different distances from said pivot axis.

14. A trailer steering system as set forth in claim 12 wherein said other end of said towbar is coupled to said slide.

15. A trailer steering system as set forth in claim 14 wherein said slide is a linear slide mounted about said pivot axis in approximately perpendicular relation with said towbar.

16. A trailer steering system as set forth in claim 14 wherein said slide is a linear slide mounted in approximately colinear relation with said towbar.

17. A trailer steering system as set forth in claim 14 wherein said steering link is coupled between said carriage and steered front wheels of said trailer.

18. A trailer steering system as set forth in claim 14 wherein said steering link is coupled between said carriage and steered rear wheels of said trailer.

19. A trailer steering system as set forth in claim 14 wherein said steering link is coupled between said carriage and front steered wheels and rear steered wheels of said trailer.

20. A trailer steering system as set forth in claim 14 wherein said trailer hitch on said tow vehicle is a conventional, unmodified trailer hitch.

21. A trailer steering system as set forth in claim 12 further comprising means for moving said carriage along said slide, said means for moving said carriage consisting of one of the group of:
    mechanical means,
    electrical means,
    hydraulic means,
    pneumatic means.

22. A trailer steering system as set forth in claim 21 further comprising a forward/reverse electrical signal applied to said means for moving said carriage along said slide responsive to said tow vehicle operating in a forward mode or reverse mode.

23. A trailer steering system as set forth in claim 12 further comprising a power steering unit coupled between said carriage and steering arms of said steered wheels of said trailer.

* * * * *